(12) United States Patent
Kim et al.

(10) Patent No.: US 10,545,780 B2
(45) Date of Patent: Jan. 28, 2020

(54) SYSTEM AND COMPUTER FOR CONTROLLING A SWITCH TO PROVIDE A VIRTUAL CUSTOMER PREMISES EQUIPMENT SERVICE IN A NETWORK FUNCTION VIRTUALIZATION ENVIRONMENT BASED ON A PREDETERMINED CONDITION BEING SATISFIED

(71) Applicant: KT Corporation, Seongnam-si (KR)

(72) Inventors: Nam Gon Kim, Daejeon (KR); Ki Sang Ok, Daejeon (KR); Je Chan Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 188 days.

(21) Appl. No.: 15/647,344

(22) Filed: Jul. 12, 2017

(65) Prior Publication Data

US 2018/0018195 A1    Jan. 18, 2018

(30) Foreign Application Priority Data

Jul. 15, 2016    (KR) .......................... 10-2016-0090227

(51) Int. Cl.
*G06F 9/455* (2018.01)
*H04L 12/24* (2006.01)
*H04L 12/66* (2006.01)

(52) U.S. Cl.
CPC .......... *G06F 9/45558* (2013.01); *H04L 12/66* (2013.01); *H04L 41/08* (2013.01); *H04L 41/0813* (2013.01); *H04L 41/0896* (2013.01); *H04L 41/12* (2013.01); *G06F 2009/45595* (2013.01); *H04L 41/18* (2013.01)

(58) Field of Classification Search
CPC . G06F 2009/4557; G06F 2009/455595; G06F 9/45558; H04L 67/10; H04L 41/12; H04L 41/5054; H04L 41/5096; H04L 41/08; H04L 41/18; H04L 41/0896; H04L 41/0813; H04L 12/66
See application file for complete search history.

(56) References Cited

U.S. PATENT DOCUMENTS

| 6,155,840 | A  | * | 12/2000 | Sallette | G09B 7/02 434/323 |
| 9,794,352 | B2 | * | 10/2017 | Qiang | H04L 67/1002 |
| 9,870,580 | B2 | * | 1/2018 | Rao | G06Q 30/04 |
| 2012/0137287 | A1 | * | 5/2012 | Pang | G06F 9/5088 718/1 |
| 2013/0322236 | A1 | * | 12/2013 | Bahadur | H04L 12/4633 370/230 |

(Continued)

*Primary Examiner* — James R Sheleheda
(74) *Attorney, Agent, or Firm* — Sughrue Mion, PLLC

(57) ABSTRACT

A system for providing virtual customer premises equipment (vCPE) services to a customer by using network function virtualization (NFV) clouds located in different regions, comprises an orchestrator managing NFV clouds located in at least two different regions; and a service manager located in each of the NFV clouds, the service manager interworking with the orchestrator. Also, the orchestrator controls the service manager to move a vCPE service for the customer from a first NFV cloud to a second NFV cloud among the NFV clouds, and provides the vCPE service to the customer through the second NFV cloud.

16 Claims, 9 Drawing Sheets

(56) References Cited

U.S. PATENT DOCUMENTS

| | | | |
|---|---|---|---|
| 2015/0201228 A1* | 7/2015 | Hasek | H04N 7/17318 |
| | | | 725/28 |
| 2015/0372973 A1* | 12/2015 | Lopez Da Silva | |
| | | | H04L 12/2818 |
| | | | 370/254 |
| 2016/0020962 A1* | 1/2016 | Carey | H04L 41/5054 |
| | | | 709/223 |
| 2016/0127226 A1* | 5/2016 | Bays | H04L 45/586 |
| | | | 370/389 |
| 2016/0226913 A1* | 8/2016 | Sood | H04L 63/20 |
| 2016/0328252 A1* | 11/2016 | Singh | G06F 9/455 |
| 2016/0373474 A1* | 12/2016 | Sood | H04L 63/1425 |
| 2016/0381000 A1* | 12/2016 | Mathew | H04L 63/0815 |
| | | | 726/4 |
| 2018/0018195 A1* | 1/2018 | Kim | G06F 9/45558 |
| 2018/0159880 A1* | 6/2018 | Sood | H04L 63/1425 |
| 2018/0375726 A1* | 12/2018 | Xia | H04L 41/0816 |
| 2019/0013967 A1* | 1/2019 | Ishii | H04L 12/66 |
| 2019/0141572 A1* | 5/2019 | Zaks | H04W 28/065 |
| 2019/0245717 A1* | 8/2019 | Kim | H04L 12/2834 |

\* cited by examiner

SYSTEM AND COMPUTER FOR CONTROLLING A SWITCH TO PROVIDE A VIRTUAL CUSTOMER PREMISES EQUIPMENT SERVICE IN A NETWORK FUNCTION VIRTUALIZATION ENVIRONMENT BASED ON A PREDETERMINED CONDITION BEING SATISFIED

CROSS-REFERENCE TO RELATED APPLICATIONS

This application claims priority to Korean Patent Application No. 10-2016-0090227 filed on Jul. 15, 2016 in the Korean Intellectual Property Office (KIPO), the entire contents of which are hereby incorporated by reference.

BACKGROUND

1. Technical Field

The present disclosure relates to network function virtualization (NFV) technologies, and more specifically, to a system for providing NFV based customer premises equipment (CPE) services independently of physical locations by using the NFV technologies, and a method for the same.

2. Related Art

Information technology (IT) services on the cloud are free to move. That is, services on the cloud can be freely moved regardless of locations of physical servers in a data center where the cloud is configured, and even service mobility between data centers is possible.

Meanwhile, with the introduction of NFV technology, network functions are virtualized, and network services can be provided wherever there is a cloud environment like the cloud-based IT services. In the case of the conventional network services centered on hardware equipment, service locations are dependent on locations of physical servers providing the network services. However, since NFV-based network services are provided through virtual machines similarly to the cloud-based IT services, the NFV-based network services can be provided independently of the physical environment.

However, unlike usual cloud-based IT services, the NFV-based network services have a restriction that the real user traffic should be accommodated by physical service providing apparatus for implementing the NFV-based network services. For example, in order for a network service such as a Network Address Translation (NAT) or a firewall to operate, a physical service providing apparatus should be located in a position where the apparatus is capable of directly receiving traffic to be processed through such the network service.

Due to such the restriction, even after the introduction of NFV technology, all network services are only available in a configured location. That is, in the present NFV-based network service environment, a method of providing a network connection for transferring customer traffic to be processed through customer premises equipment (CPE) network services to a virtual CPE (vCPE) service in a selected NFV-based cloud has not been defined yet.

SUMMARY

A first embodiment according to the present disclosure provides a NFV cloud service system that provides vCPE services independent of physical locations by using NFV clouds located in different regions, as a NFV based network service provisioning environment.

Also, a second embodiment according to the present disclosure provides a NFV Cloud, which is installed in customer premises and provides vCPE services independently of physical location.

Also, a third embodiment according to the present disclosure provides a NFV Cloud, which is installed in a local telecommunication office of a communication service provider and provides vCPE services independently of physical location.

Also, a fourth embodiment according to the present disclosure provides a NFV Cloud, which is installed in a data center and provides vCPE services independently of physical location.

Also, a fifth embodiment according to the present disclosure provides a dualization method for vCPE services for a customer by using heterogeneous NFV clouds.

In order to achieve the objectives of the present invention, an embodiment of the present disclosure provides a system for providing vCPE services to a customer by using NFV clouds located in different regions, the system comprising an orchestrator managing NFV clouds located in at least two different regions; and a service manager located in each of the NFV clouds, the service manager interworking with the orchestrator. Also, the orchestrator may control the service manager to move a vCPE service for the customer from a first NFV cloud to a second NFV cloud among the NFV clouds, and provide the vCPE service to the customer through the second NFV cloud.

The different regions may include at least two of customer premises, a local telecommunication office (LTO) of a communication service provider, and a data center (DC).

When one of the NFV clouds is a customer NFV cloud located in the customer premises, the customer NFV cloud may comprise at least one vCPE service having a local area network (LAN) virtual interface and a wide area network (WAN) virtual interface, respectively; a LAN virtual network coupled to the LAN virtual interface of the at least one vCPE service; a WAN virtual network coupled to the WAN virtual interface of the at least one vCPE service; a LAN physical interface for providing customer traffic received from the customer to the LAN virtual network; and a WAN physical interface for outputting traffic that has passed through the at least one vCPE service output from the WAN virtual network.

The customer NFV cloud may further comprise a service manager controlling, in accordance with a control of an orchestrator managing at least two NFV clouds including the NFV cloud, the LAN physical interface and the WAN physical interface so that the customer traffic received from the LAN physical interface is transferred to the LAN virtual network or directly outputted through the WAN physical interface.

When one of the NFV clouds is a LTO NFV cloud located in the LTO of the communication service provider, the LTO NFV cloud may comprise at least one compute node, a LAN switch, a WAN switch, a line concentrator switch, and a router, and each of the at least one compute node comprises at least one vCPE service having a LAN virtual interface and a WAN virtual interface, respectively; a LAN virtual network coupled to the LAN virtual interface of the at least one vCPE service; a WAN virtual network coupled to the WAN virtual interface of the at least one vCPE service; a LAN physical interface coupled to the LAN virtual network and the LAN switch; and a WAN physical interface coupled to the WAN virtual network and the WAN switch. Also, the line concentration switch may transfer customer traffic flowing from the customer to the LAN switch, transfer the customer traffic directly to the router, or output the customer traffic to the router or outside through a predetermined tunneling process. Also, the router may output the customer traffic transferred directly from the WAN switch or the line concentration switch to outside, or output the customer traffic transferred from the line concentration switch to outside through a predetermined tunneling.

The service manager of the LTO NFV cloud may control the line concentration switch so that the customer traffic flowing from the customer is directly transferred to the LAN switch or the router, or outputted to the router or outside through the predetermined tunneling process according to a control of the orchestrator.

The predetermined tunneling may include at least one of a generic routing encapsulation (GRE) tunneling, a stateless transport tunneling (STT), and a VxLAN tunneling, and the customer traffic through the predetermined tunneling may be outputted to outside through the router. Also, the predetermined tunneling may be a tunneling through a multi-protocol label switching (MPLS) switch, and the customer traffic to which the tunneling through the MPLS switch is applied may be output to outside without going through the router.

When one of the NFV clouds is a DC NFV cloud located in the DC, the DC NFV cloud may comprise at least one compute node, a top of rack (TOR) switch, and a router, and each of the at least one computer node comprises at least one vCPE service having a LAN virtual interface and a WAN virtual interface, respectively; a LAN virtual network coupled to the LAN virtual interface of the at least one vCPE service; a WAN virtual network coupled to the WAN virtual interface of the at least one vCPE service; and a physical interface coupled to the LAN virtual network and the WAN virtual network. Also, the TOR switch may separate a LAN traffic from the customer and a WAN traffic from outside by using network virtualization techniques applied to the LAN traffic and WAN traffic, transfer the LAN traffic to the LAN virtual network, and transfer the WAN traffic to the WAN virtual network.

The network virtualization techniques used for separating the LAN traffic from the customer and the WAN traffic from outside may include a tunneling or a VLAN virtualization configured through the orchestrator by a service administrator of the NFV cloud.

When the LAN traffic from the customer uses the tunneling as a network virtualization technique, the customer traffic from the customer may be transferred to the TOR switch as decapsulated according to the tunneling after going through the router.

The system may further comprise a monitoring server collecting status information of the NFV clouds, wherein each of the NFV clouds has a monitoring agent reporting status information of each of the NFV clouds to the monitoring server.

The monitoring agent may report status information of each of the NFV clouds, vCPE services for the customer, and a compute node executing the vCPE services for the customer.

The orchestrator may control the service managers of the NFV clouds according to the status information of the NFV cloud provided by the monitoring server and a service level agreement (SLA) policy for the customer so that the vCPE service for the customer is transferred from the first NFV cloud to the second NFV cloud.

When the SLA policy for the customer is a policy that prioritizes minimum transmission latency, the vCPE service for the customer may be provided by one of the NFV clouds in the order of the customer NFV cloud, the LTO NFV cloud, or the DC NFV cloud.

When the SLA policy for the customer is a policy that prioritizes maximum scalability, the vCPE service for the customer may be provided by one of the NFV clouds in the order of the DC NFV cloud, the LTO NFV cloud, or the customer NFV cloud.

When the SLA policy for the customer is a policy based on bandwidth usage, if the bandwidth usage of the customer exceeds a predetermined threshold, the vCPE service for the customer may be transferred from the customer NFV cloud or the LTO NFV cloud to the LTO NFV cloud or the DC NFV cloud.

When the second NFV cloud is a LTO NFV cloud located in the LTO, layer-2 (L2) traffic of the customer may be transferred to the LTO NFV cloud through a customer NFV cloud located in the customer premises. When, the second NFV cloud is a DC NFV cloud located in the DC, layer-2 (L2) traffic of the customer may be transferred to the DC NFV cloud through a customer NFV cloud located in the customer premises and a LTO NFV cloud located in the LTO.

In order to achieve the objectives of the present invention, another embodiment of the present disclosure provides a customer NFV cloud which provides vCPE services to a customer and is located at customer premises, the customer NFV cloud comprising at least one vCPE service having a LAN virtual interface and a WAN virtual interface, respectively; a LAN virtual network coupled to the LAN virtual interface of the at least one vCPE service; a WAN virtual network coupled to the WAN virtual interface of the at least one vCPE service; a LAN physical interface for providing customer traffic received from the customer to the LAN virtual network; a WAN physical interface for outputting traffic that has passed through the at least one vCPE service output from the WAN virtual network; and a service manager controlling, in accordance with a control of an orchestrator managing at least two NFV clouds including the NFV cloud, the LAN physical interface and the WAN physical interface so that the customer traffic received from the LAN physical interface is transferred to the LAN virtual network or directly outputted through the WAN physical interface.

The customer NFV cloud may be configured with a single compute node.

The service manager may control the customer traffic received from the LAN physical interface to be directly outputted through the WAN physical interface by using a bridge function of an operating system of a compute node in which the NFV cloud is located or a bypass network interface card (NIC) function of the LAN physical interface.

The customer NFV cloud may further comprise a monitoring agent reporting, to the orchestrator, status information of at least one of the at least one vCPE service, the LAN virtual network, the WAN virtual network, the LAN physical interface, and the WAN physical interface.

When a service level agreement (SLA) policy for the customer is a policy that prioritizes minimum transmission latency, the customer NFV cloud may provide the at least one vCPE service to the customer prior to a LTO NFV cloud located in a local telecommunication office.

In order to achieve the objectives of the present invention, yet another embodiment of the present disclosure provides a LTO NFV cloud which provides vCPE services to a customer and is located at a local telecommunication office, the NFV cloud comprising at least one compute node, a LAN switch, a WAN switch, a line concentrator switch, and a router. Also, each of the at least one compute node comprises at least one vCPE service having a LAN virtual interface and a WAN virtual interface, respectively; a LAN virtual network coupled to the LAN virtual interface of the at least one vCPE service, a WAN virtual network coupled to the WAN virtual interface of the at least one vCPE service; a LAN physical interface coupled to the LAN virtual network and the LAN switch; a WAN physical interface coupled to the WAN virtual network and the WAN switch; and a service manager controlled by an orchestrator for managing at least two NFV clouds including the NFV cloud. Also, the line concentration switch may transfer customer traffic flowing from the customer to the LAN switch, transfer the customer traffic directly to the router, transfer the customer traffic directly to the router, or output the customer traffic to the router or outside through a predetermined tunneling under a control of the service manager.

The predetermined tunneling may include at least one of a GRE tunneling, a STT, and a VxLAN tunneling, and the customer traffic outputted to the router through the predetermined tunneling may be outputted to outside through the router.

The predetermined tunneling may include a tunneling through a multi-protocol label switching (MPLS) switch, and the customer traffic to which the tunneling through the MPLS switch is applied may be output to outside without going through the router.

The LTO NFV cloud may further comprise a monitoring agent reporting, to the orchestrator, status information of at least one of the at least one computer node, the at least one vCPE service, the LAN virtual network, the WAN virtual network, the LAN physical interface, and the WAN physical interface.

When a SLA policy for the customer is a policy that prioritizes minimum transmission latency the NFV cloud may provide the at least one vCPE service to the customer prior to a DC NFV cloud located in a data center, and provide the at least one vCPE service to the customer posterior to a customer NFV cloud located in customer premises.

In order to achieve the objectives of the present invention, yet another embodiment of the present disclosure provides a DC NFV cloud which provides vCPE services to a customer and is located at a data center, the NFV cloud comprising at least one compute node, a top of rack (TOR) switch, and a router, and each of the at least one computer node comprises at least one vCPE service having a LAN virtual interface and a WAN virtual interface, respectively; a LAN virtual network coupled to the LAN virtual interface of the at least one vCPE service, a WAN virtual network coupled to the WAN virtual interface of the at least one vCPE service; and a physical interface coupled to the LAN virtual network and the WAN virtual network. Also, the TOR switch may separate a LAN traffic from the customer and a WAN traffic from outside by using network virtualization techniques applied to the LAN traffic and WAN traffic, transfer the LAN traffic to the LAN virtual network, and transfer the WAN traffic to the WAN virtual network.

The network virtualization techniques used for separating the LAN traffic from the customer and the WAN traffic from outside may include a tunneling or a VLAN virtualization configured through the orchestrator by a service administrator of the NFV cloud.

When the LAN traffic from the customer uses the tunneling as a network virtualization technique, the LAN traffic from the customer may be transferred to the TOR switch as decapsulated according to the tunneling after going through the router.

The DC NFV cloud may further comprise a monitoring agent reporting to the orchestrator status information of at least one of the at least one vCPE service, the LAN virtual network, the WAN virtual network, and the physical interface.

When a SLA policy for the customer is a policy that prioritizes minimum transmission latency, the NFV cloud provides the at least one vCPE service to the customer posterior to the customer NFV cloud and the LTO NFV cloud.

In order to achieve the objectives of the present invention, yet another embodiment of the present disclosure provides a vCPE dualization method of dualizing vCPE services for a customer by using NFV clouds located in different regions, the method comprising requesting, by an orchestrator managing the NFV clouds, a first service agent managing the vCPE services for the customer in a first NFV cloud to perform backup of information on the vCPE services for the customer; performing, by the first service agent, backup of the information on the vCPE services for the customer; creating, by the orchestrator, vCPE services for the customer and a second service agent managing the vCPE services in a second NFV cloud, and executing the second service agent; and applying, by the orchestrator, the backed-up information on the vCPE service for the customer to the vCPE services created on the second NFV cloud through the second service agent.

The different regions may include at least two of customer premises, a local telecommunication office (LTO) of a communication service provider, and a data center (DC).

In the step of performing backup of the information on the vCPE services for the customer in the first NFV cloud, information on the first service agent and information on a monitoring agent for the customer may be further backed-up in the first NFV cloud.

Also, the information on the first service agent may be applied to the second service agent.

When a system for dynamically providing vCPE services using heterogeneous NFV clouds according to the present disclosure is used, diversity of service configuration and resource efficiency can be ensured. In particular, NFV clouds located in different geographical locations can be managed by a single orchestrator, so that various requirements of customers can be satisfied in resiliency manner.

In addition, if processing capacity of a lower-level NFV cloud is temporarily shortened, the system can immediately satisfy the service requirements by utilizing an upper-level NFV cloud. Further, even if the lower-level NFV cloud fails, the upper-level NFV cloud can be utilized to provide service continuity. Further, even if the number of subscribers of the lower-level NFV cloud exceeds its allowed limit, the upper-level NFV cloud can be utilized to immediately accommodate new customers up to capacity expansion of the lower-level NFV cloud.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Figure 1:
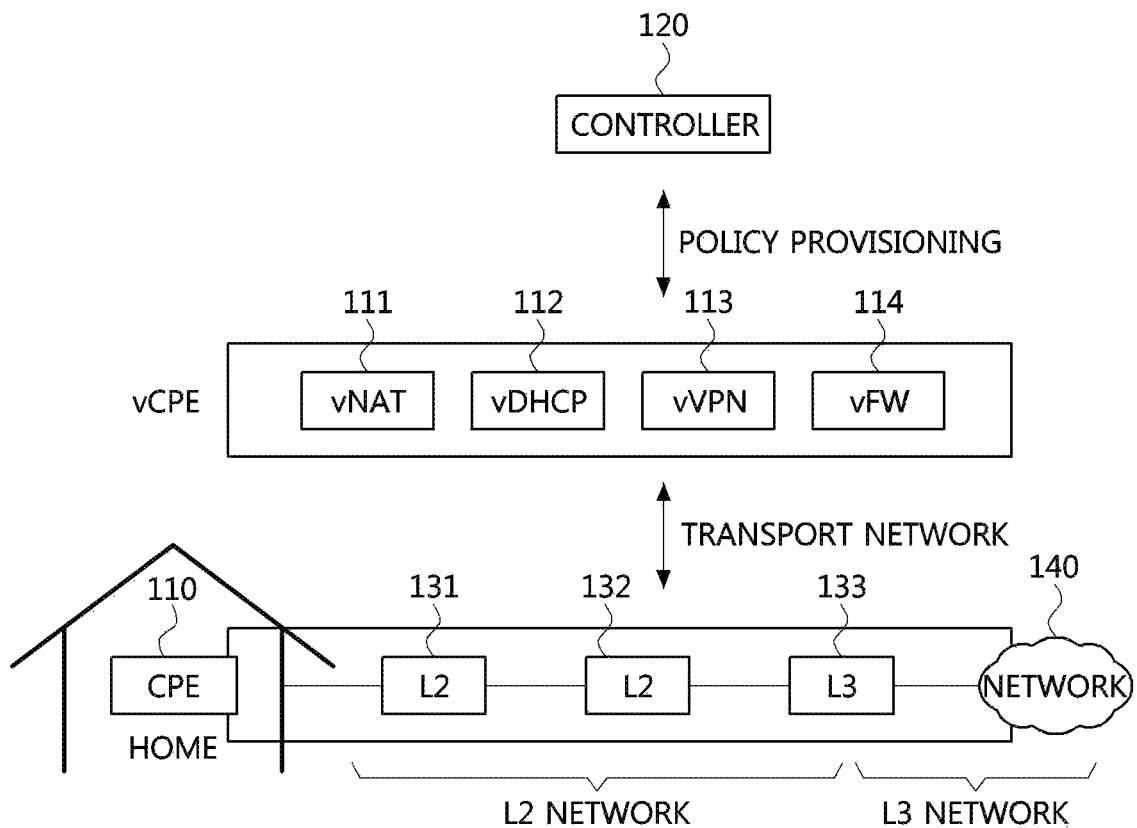
FIG. 1 is a conceptual diagram for explaining virtualization of customer premises equipment (CPE) network services.

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a conceptual diagram for explaining virtualization of customer premises equipment (CPE) network services.

Referring to FIG. 1, customer premises equipment (CPE), which is an in-house apparatus directly connected to a network of a communication service provider (CSP), may be provided by the CSP or installed by a subscriber (or customer). For example, a CPE 110 may be one of a variety of terminal apparatuses such as a router, a home gateway, and a femto cell.

That is, the CPE 110 may be located in a customer (i.e., subscriber) home, provide a connection with a communication channel provided by the CSP, and generally perform functions such as a router, a firewall, a network address translation (NAT) and a dynamic host configuration protocol (DHCP). In other words, the CPE may receive traffic originating from the customer side and provide the customer with Internet connections through the communication channel, or act as a firewall for the traffic coming from the Internet.

In virtualization of the CPE network services according to an embodiment of the present disclosure, the CPE network services may not be performed in the home CPE but in a NFV cloud by virtualizing the CPE network services.

That is, a virtual CPE (vCPE) may be a set of virtualized network service functions for providing the virtualized CPE network services in the NFV cloud, and may be composed of vNAT 111, vDHCP 112, vVPN 113, vFW 114, and the like.

For example, in case that the conventional CPE requires network service elements such as a NAT, a DHCP, a broadband remote access server (BRAS), a firewall, etc., the vCPE may provide these network service elements as virtualized service functions (SFs) such as vNAT 111, vDCHP 112, vVPN 113, vFW 114, and the like.

The vNAT 111 may convert private internet protocol (IP) address and port into public IP address and port to enable communications between a private IP network and a public IP network. It may also be made possible to protect a user's internal network from an external network constituted by the public IP network by configuring the user's internal network as a private IP network.

The vDHCP 112 may perform a role of assigning a private IP address to a terminal or a network device connected to the CPE 110. However, a specific terminal may be assigned a public IP address through a DHCP server of the CSP without being assigned a private IP address through the vDHCP of the vCPE.

The vFW 114 may perform firewall functions to block and control aggressive traffic and harmful traffic from the external network. Also, the vVPN 113 may perform a function of configuring a virtual private network (VPN) with an external host through a public network which is an external network.

In the case of CPE virtualization, the CPE 110 may be configured to have only a few basic network functions, such as layer-2 (L2) switching. A controller 120 may perform a function of configuring and managing a corresponding policy according to which network functions of the vCPE are used by a specific customer. Also, the CPE 110 may also communicate with the vCPE services in the NFV cloud through a transport network.

In addition to the existing cloud infrastructure configuration, the NFV cloud for provisioning of the vCPE network services may be configured to have a direct network connection with the CSP as well as a connection to the customer in order to receive the customer's traffic.

The NFV cloud according to embodiments of the present disclosure may exist not only within customer premises, but also within the CSP's local telecommunication office (LTO) or a data center (DC). Unlike the conventional IT cloud, the NFV cloud according to the present disclosure may be configured in a relatively small size and may have various node configurations. For example, the NFV cloud may be located in customer premises as a single computer node, or may be located in the LTO with a single rack or dual rack configuration. Also, it may also be extended to a larger scale, and located in a strategic position.

Configuration of NFV Clouds

The NFV cloud according to the present disclosure may have a wide variety of forms as the conventional IT cloud. For example, the smallest NFV cloud may be provided with all cloud components and vCPE network service functions running on a single compute node. Alternatively, the NFV cloud may be provided in a form that simultaneously provides services to a plurality of customers using a plurality of compute nodes. In this case, the NFV cloud may be typically configured in a small server room and may be located at the LTO of the CSP. Alternatively the NFV cloud may be configured using a large number of compute nodes in a large space such as a DC.

The configurations of the NFV cloud for the vCPE service according to the present disclosure described above will be explained with reference to FIGS. 2 to 4.

Figure 2:
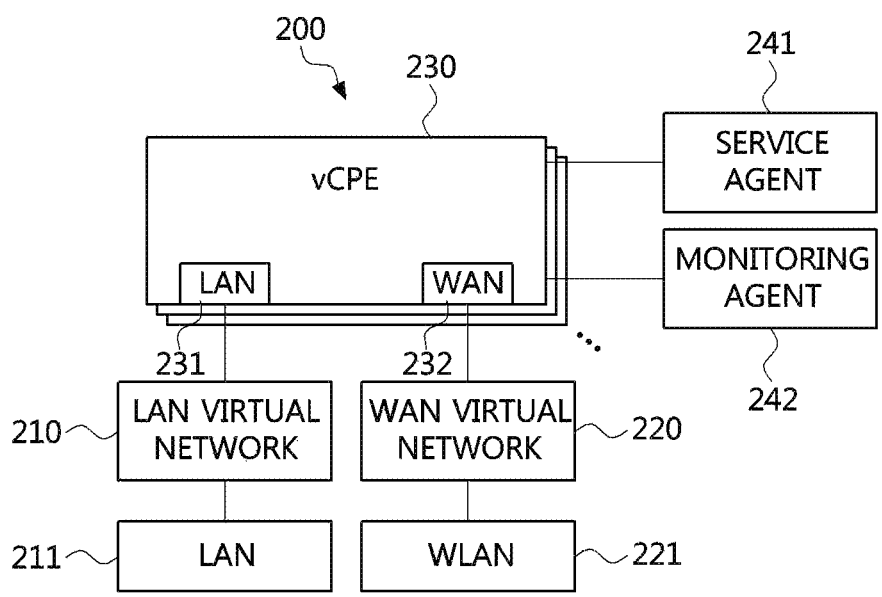
FIG. 2 is a block diagram illustrating a NFV cloud for vCPE services according to an embodiment of the present disclosure.

FIG. 2 is a block diagram illustrating a NFV cloud for vCPE services according to an embodiment of the present disclosure.

The NFV cloud 200 for vCPE services illustrated in FIG. 2 may have a form in which all cloud components operate in a single compute node and vCPE network services for a customer operate in the single compute node. Since the NFV cloud illustrated in FIG. 2 is installed in the customer premises, it may be referred to as 'customer NFV cloud' hereinafter.

Referring to FIG. 2, a network configuration of the customer NFV cloud 200 may be different from the conventional IT cloud. That is, although the conventional IT cloud is connected to the outside of the cloud via a layer-3 (L3) based IP network, the customer NFV cloud 200 according to the present disclosure may be connected to the outside of the cloud via a L2 based Ethernet network.

Also, in the customer NFV cloud 200 according to the present disclosure, a plurality of virtual networks may be configured to provide the vCPE services. That is, a Local Area Network (LAN) virtual network 210 may be basically configured for connection with the customer. Also, a wide area network (WAN) virtual network 220 for connection with the external Internet may be configured.

Also, at least one vCPE service 230 may be executed on the compute node of the NFV cloud 200. In FIG. 2, only one vCPE service is illustrated as highlighted for convenience of description, but two or more vCPE services may be executed on the NFV cloud 200. As described above with reference to FIG. 1, the vCPE service 230 may be a service such as NAT, DHCP, BRAS, or firewall. The vCPE service 230 may be connected to the LAN virtual network 210 and the WAN virtual network 220 described above via a LAN virtual interface 231 and a WAN virtual interface 232 of each service. That is, at least one vCPE service including the vCPE service 230 may be connected to the LAN virtual network 210 and the WAN virtual network 220 via their respective LAN virtual interfaces and WAN virtual interfaces. Here, L2 traffic from the customer may be inputted through the LAN virtual interface 231, and L3 traffic for which the vCPE service is processed may be output through the WAN virtual interface 232.

The LAN virtual network 210 and the WAN virtual network 220 may be respectively connected to a LAN physical interface 211 and a WAN physical interface 221. The LAN physical interface 211 may receive L2 traffic from the customer, and the WAN physical interface 221 may provide transparent network connectivity with the network outside the NFV cloud (e.g., Internet).

Also, a service agent 241 that interacts with an orchestrator to manage the vCPE services 230 and perform interworking with other NFV clouds to be described later and a monitoring agent 242 for detecting abnormal operation of the NFV cloud 200 may be provided on the NFV cloud 200.

Since the customer NFV cloud 200 is configured as a single compute node unlike a LTO NFV cloud 300 and a DC NFV cloud 400 which will be described later, the service agent 241 and the monitoring agent 242 may directly interoperate with an orchestrator or a monitoring server to be described later without a service manager or a monitoring manager. In this regard, the service agent 241 and the monitoring agent 242 of the customer NFV cloud 200 may be referred to as a service manager or a monitoring manager, respectively. In the following description, a service agent and a monitoring agent that exist for each customer may be referred to as 'agent', and components managing a plurality of service agents and monitoring agents in the LTO NFV cloud 300 and the DC NFV cloud 400 may be respectively referred to as 'service manager' and 'monitoring manager'. On the other hand, since the service agent 241 and the monitoring agent 242 existing in the customer NFV cloud 200 illustrated in FIG. 2 interoperate directly with the orchestrator or the monitoring server, they may be referred to as 'agent' or referred to as 'manager'. In the following description, the service agent 241 and the monitoring agent 242 of the customer NFV cloud 200 may be referred to as a service agent and a monitoring agent in terms of emphasizing roles and functions for respective customers. Also, the service agent 241 and the monitoring agent 242 may be referred to as a service manager and a monitoring manager in terms of emphasizing interoperations with the orchestrator and the monitoring server.

Although not shown in FIG. 2, the service agent 241 and the monitoring agent 242 may be configured to communicate directly with the orchestrator and the monitoring server via the WAN physical interface 221.

Also, although not shown in FIG. 2, the customer NFV cloud 200 may further comprise a compute node monitoring agent that monitors the compute node. That is, the service agent 241 and the monitoring agent 242 are components for each customer, but the compute node monitoring agent may be a component for each compute node. In the case of the customer NFV cloud 200, the monitoring agent 242 may serve as a compute node monitoring agent because the customer NFV cloud 200 is composed of a single compute node and has a configuration for a single customer.

Meanwhile, when the vCPE services 230 is removed or fails, the traffic from the customer may not be transmitted to the vCPE service 230 but transmitted directly from the LAN physical interface 211 to the WAN physical interface 221. If the LAN physical interface 211 is configured as a bypass network interface card (NIC), when a problem occurs in the compute node itself in which the vCPE service 230 operate, the WAN physical interface 221 may directly output the traffic from the customer through hardware setting under the control of the service agent 241 in cooperation with the orchestrator to be described later. Alternatively, when an operating system (OS) of the compute node operating the vCPE services operates normally, traffic flowing into the LAN physical interface 211 may be transferred directly to the WAN physical interface 221 through a bridge function operating on the OS. In this case, the L2 traffic flowing from the customer may be delivered directly to the LTO NFV cloud or the DC NFV cloud, which will be described later, without going through the vCPE service 230 of the customer NFV cloud 200. At this time, the L2 traffic coming from the customer may be transmitted to the LTO NFV cloud or the DC NFV cloud through a predetermined tunneling process. The components such as a tunnel gateway for this purpose are not shown in FIG. 2.

Figure 3:
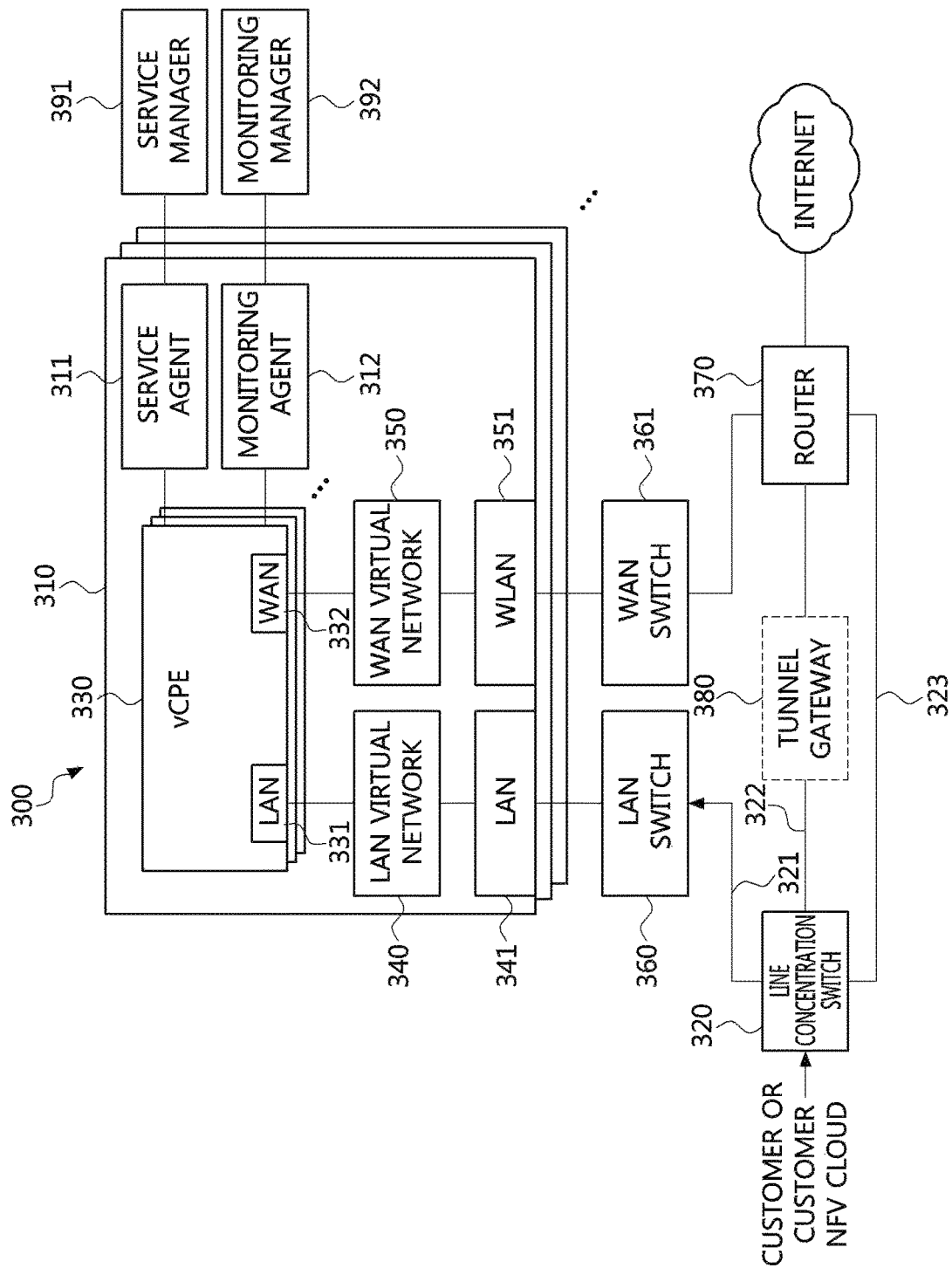
FIG. 3 is a block diagram illustrating a NFV cloud for vCPE services according to another embodiment of the present disclosure.

FIG. 3 is a block diagram illustrating a NFV cloud for vCPE services according to another embodiment of the present disclosure.

The customer NFV cloud 200 for the vCPE service illustrated in FIG. 2 is the NFV cloud located in the customer premises, while the NFV cloud 300 illustrated in FIG. 3 may be located in a LTO of the CSP. As described above, the NFV cloud illustrated in FIG. 3 will be hereinafter referred to as a 'LTO NFV cloud' in that it is installed in the LTO of the CSP.

The configuration for providing the vCPE service to the customer through the LTO NFV cloud 300 is relatively more complicated than the case of providing the vCPE service to the customer using the customer NFV cloud 200 of FIG. 2. In FIG. 3, a single compute node 310 is emphasized for convenience of explanation. However, when the NFV cloud is located in the LTO, a plurality of compute nodes may be configured to provide vCPE services to a plurality of customers simultaneously.

Each of the compute nodes (e.g., a computer node 310) constituting the LTO NFV cloud 300 may have a LAN virtual network 340 and a WAN virtual network 350 as in the configuration of the customer NFV cloud 200 composed of a single node described above, and at least one vCPE service 330 connected with them through a LAN virtual interface 331 and a WAN virtual interface 332. Likewise, the LAN virtual network 340 and the WAN virtual network 350 may be connected to a LAN physical interface 341 and a WAN physical interface 351 of the compute node 310. That is, the LAN physical interface 341 and the WAN physical interface 351 may exist for each compute node.

Also, in the case of the LTO NFV cloud 300, a service agent 311 and a monitoring agent 312 assigned to each customer may be executed, and a service manager 391 and a monitoring manager 392 that manage the operations of the service agent 311 and the monitoring agent 312, collect information therefrom, and deliver control commands from the orchestrator or the monitoring server to the service agent 311 and the monitoring agent 312 may be executed in one of the compute nodes or in a separate server existing within the LTO. Here, the service manager 391 may operate in conjunction with the orchestrator to be described later, and the monitoring manager 392 may operate in conjunction with a monitoring server to be described later. Also, although not shown in FIG. 3, the service manager 391 and the monitoring manager 392 may be configured to directly communicate with the orchestrator and the monitoring server through the WAN physical interface 351.

Although not shown in FIG. 3, each compute node of the LTO NFV cloud 300 may further comprise a compute node monitoring agent that monitors each compute node. That is, the service agent 311 and the monitoring agent 312 are components for each customer, and the compute node monitoring agent is a component for each compute node.

Unlike the customer NFV cloud 200 configured with a single compute node illustrated in FIG. 2, the node-specific LAN physical interface 341 and the node-specific WAN physical interface 351 of the LTO NFV cloud 300 may provide connections with an external network as connected to a LAN switch 360 and a WAN switch 361. In other words, unlike the customer NFV cloud 200, the LTO NFV cloud 300 may be composed of a plurality of compute nodes, so that traffic inputted or outputted through each compute node may be inputted from or outputted to the outside through the switches 360 and 361. At this time, the traffic from each customer may be collected through a line concentration switch 320 in the LTO. Also, the traffic for each customer may be classified using Virtual LAN (VLAN) tags, for example.

That is, the vCPE services for each customer may be configured in one (or two or more) of the compute nodes constituting the LTO NFV cloud 300, and may be connected to the node-specific LAN virtual network 340 and WAN virtual network 350 through the respective LAN virtual interface 331 and WAN virtual interface 332.

Describing this in terms of traffic, traffic from the customer (when the customer NFV cloud 200 does not exist) or the traffic from the customer NFV cloud 200 may reach the LAN switch 360 through the line concentration switch 320, and may be delivered to the LAN physical interface 341 of the compute node in which the corresponding vCPE services for the customer are generated by using the VLAN tag of the traffic. The traffic inputted to the LAN physical interface 341 of the compute node may be delivered to the vCPE service 330 for the corresponding customer through the LAN virtual network 340. Then, the traffic processed by the vCPE service 330 may be transmitted to a router 370 in the LTO via the WAN virtual network 350, the WAN physical interface 351, and the WAN switch 361. Finally, the traffic is routed through the router 370 to the external Internet.

The line concentration switch 320 may have three output ports for selecting one of at least three output paths. The at least three output paths may include a path 321 that passes the traffic from the customer to the compute node executing the vCPE services through the LAN switch 360, a path 323 that directly passes the traffic from the customer to the router 370, and a path 322 that passes the traffic from the customer to the router 370 through a tunnel gateway 380 in order to deliver the traffic to the DC NFV cloud to be described later.

The path 321 is a path selected when the traffic from the customer should be processed by not the customer NFV cloud 200 but the vCPE services 330 of the LTO NFV cloud 300. The path 321 may deliver the traffic from the customer to the compute node of the LTO NFV cloud 300 in which the corresponding vCPE services are executed. The traffic passing through this path may be L2 traffic. That is, the path 321 may be a path for the traffic directly delivered to the LTO NFV cloud 300 through the bypass NIC or the function (e.g., bridge function) of the OS when a failure occurs in the vCPE service or the compute node of the customer NFV cloud 200, or the L2 traffic transferred directly from the customer to the LTO NFV cloud 300. At this time, the L2 traffic flowing from the customer NFV cloud 200 may be transmitted to the LTO NFV cloud 300 through a predetermined tunneling process. The components such as a tunnel gateway for this purpose are not shown.

The path 322 is a path for directly transmitting the traffic from the customer to the DC NFV cloud 400, which will be described later, without going through the vCPE service of the LTO NFV cloud 300. For example, it may be a path selected when a failure occurs in the vCPE service of the LTO NFV cloud 300, or when the vCPE service of the LTO NFV cloud 300 does not exist. At this time, the customer traffic transmitted through the path 322 may be transmitted through the router 370 to the DC NFV cloud 400 by using L3 based (IP-based) tunneling such as a Generic Routing Encapsulation (GRE), a Stateless Transport Tunneling (STT), and VxLAN. Here, a tunnel gateway 380 for the tunneling may exist between the line concentration switch 320 and the router 370. Meanwhile, the traffic delivered to the path 322 may be directly transmitted to the DC NFV cloud 400 via a Multi-Protocol Label Switching (MPLS) switch without going through the router 370.

Finally, the path 323 is a path through which the traffic delivered through the vCPE service of the customer NFV cloud 200 is delivered. Since the traffic transmitted through the path 323 is already L3 (IP based) traffic and the vCPE service for the customer is already provided through the customer NFV cloud 200, the traffic may be directly transmitted to the router 370, and output to the external Internet.

Figure 4:
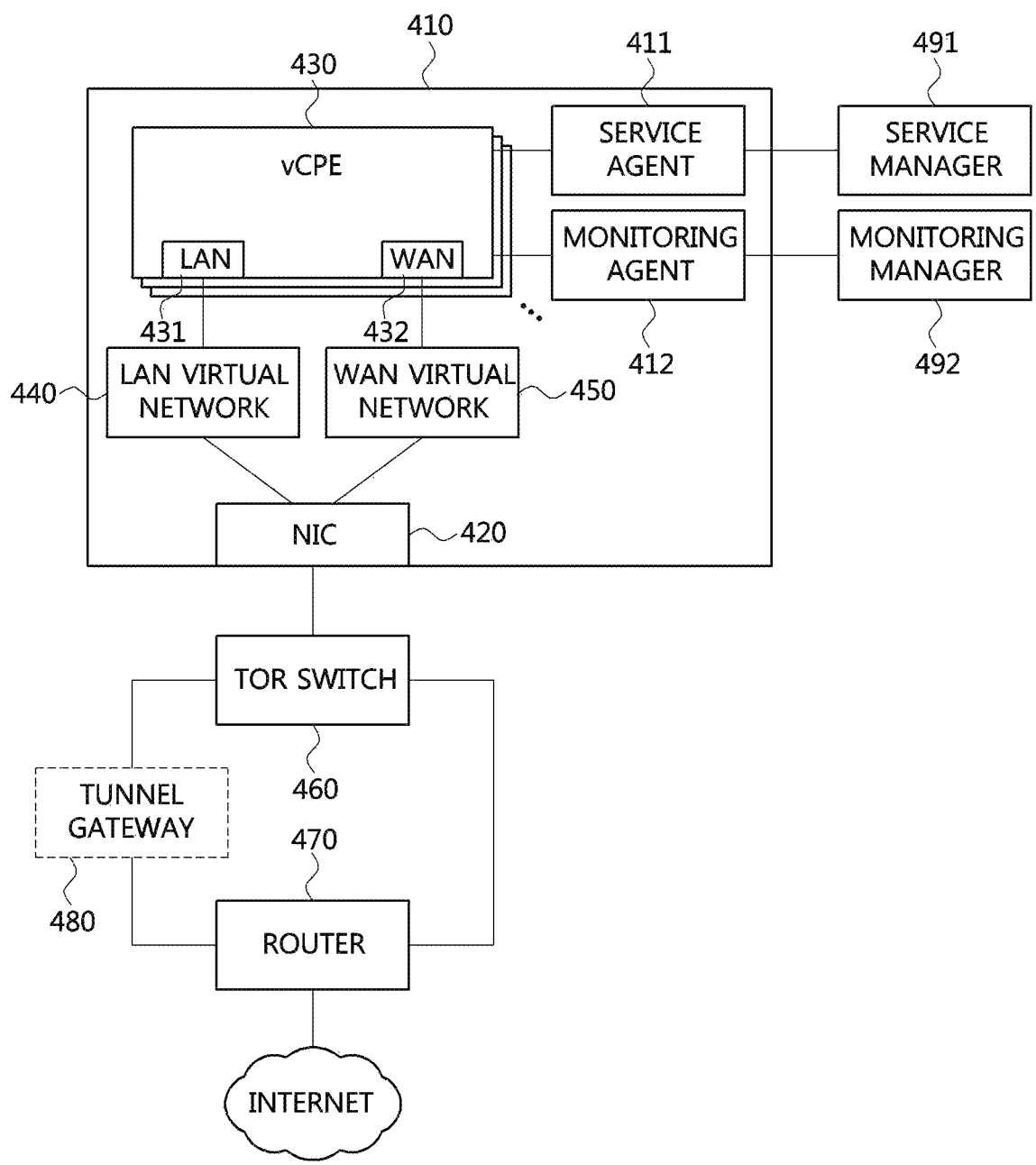
FIG. 4 is a block diagram illustrating a NFV cloud for vCPE services according to yet another embodiment of the present disclosure.

FIG. 4 is a block diagram illustrating a NFV cloud for vCPE services according to yet another embodiment of the present disclosure.

Unlike the NFV clouds 200 and 300 for the vCPE services illustrated in FIGS. 2 and 3, a NFV cloud 400 illustrated in FIG. 4 may be implemented with a plurality of compute nodes existing in a server farm of a data center. Accordingly, as described above, the NFV cloud 400 illustrated in FIG. 4 may be referred to as a 'data center (DC) NFV cloud' in the following because it is installed in a DC.

The vCPE services on the DC NFV cloud 400 may also be coupled to the LAN virtual network and WAN virtual network of the corresponding computing node on which each vCPE service is running.

Meanwhile, the DC NFV cloud may be implemented in two forms.

First, the DC NFV cloud 400 may be configured in a larger size of the above-described LTO NFV cloud 300 of FIG. 3. That is, if the DC NFV cloud 400 is configured for the virtualized CPE services according to the present disclosure, similarly to the case of the NFV cloud 300 of FIG. 3 described above, the DC NFV cloud may be implemented to comprise LAN physical interfaces and WAN physical interfaces that exist for respective compute nodes, a LAN switch and a WAN switch to which the LAN physical interfaces and WAN physical interfaces of the compute nodes are connected, a line concentration switch, and a router.

Second, the DC NFV cloud may be implemented on a data center. For example, in the DC NFV cloud 400 illustrated in FIG. 4, each of the compute nodes 410 does not have a LAN physical interface for a LAN virtual network 440 and a WAN physical interface for a WAN virtual network 450 unlike the configuration specialized for the vCPE services. Instead of the LAN physical interface and the WAN physical interface, each of the compute nodes 410 may have only a NIC 420 having functions of both physical interfaces. Also, the compute nodes 410 may be connected through a Top of Rack (TOR) switch 460. The first type of the DC NFV cloud is the same configuration as the LTO NFV cloud 300 described above, and thus so a description thereof will be omitted. Hereinafter, only the second type DC NFV cloud 400 will be described below.

As described above, in the DC NFV cloud 400 illustrated in FIG. 4, each of the compute nodes 410 may have only the NIC 420 that combines the functions of the LAN physical interface and the WAN physical interface. Accordingly, in the DC NFV cloud 400 illustrated in FIG. 4, traffic inputted through the NIC 420 in which a LAN and a WAN are not divided may be separated into LAN traffic and WAN traffic by using a network virtualization technique such as VLAN or tunneling. At this point, the network virtualization technique applied to the LAN traffic and the network virtualization technique applied to the WAN traffic may be different.

For example, tunneling such as GREm STT. VxLAN, and MPLS may be used for the LAN traffic, and network virtualization techniques such as tunneling or VLAN technology may be used for the WAN traffic. Specifically, it is not easy to transfer the customer traffic directly to the data center in the form of VLAN, and thus a tunnel may be configured to transfer the customer traffic to the vCPE. That is, the traffic flowing through the router 470 may be delivered to the TOR switch 460 through a tunnel gateway 480. Here, the tunnel gateway 480 may act a role corresponding to the tunnel gateway 380 of the LTO NFV cloud 300 described above. That is, if the tunnel gateway 380 encapsulates traffic packets for the tunneling, the tunnel gateway 480 may decapsulate the encapsulated traffic packets, and transfer the decapsulated traffic packets to the TOR switch 460.

Meanwhile, in the case in which the traffic transferred through the path 322 from the line concentration switch 320 of the LTO NFV cloud 300 is transferred through a MPLS switch, the traffic may be directly transferred to the TOR switch 460 through the MPLS switch (not shown) without going through the router 470.

Similarly to the case of the LTO NFV cloud 300 of FIG. 3 described above, in the case of the DC NFV cloud 400, a service agent 411 and a monitoring agent 412 assigned to each customer may be executed. Also, a service manager 491 and a monitoring manager 492 which manage operations of the service agents and monitoring agents may operate in any one of the compute nodes or in a separate compute node (or, server) existing in the data center. Here, under the control of the orchestrator, the service manager 491 may transfer the traffic of the customer, which has flowed through the tunnel gateway 480, to the TOR switch 460 through the predetermined tunneling process. Here, the traffic of the customer may be directly delivered from the customer NFV cloud 200 without going through the vCPE service for the corresponding customer in the customer NFV cloud 200, or directly delivered from the LTO NFV cloud 300 without going through the vCPE service for the corresponding customer in the LTO NFV cloud 300.

At this time, the service manager 491 may operate in conjunction with an orchestrator to be described later, and the monitoring manager 492 may operate in conjunction with a monitoring server to be described later. Also, although not shown in FIG. 4, the service manager 491 and the monitoring manager 492 may be configured to directly communicate with the orchestrator and the monitoring server through the NIC 420.

Also, although not shown in FIG. 4, each of the compute nodes 410 of the DC NFV cloud 400 may further comprise a compute node monitoring agent that monitors each compute node. That is, the service agent 411 and the monitoring agent 412 are components for each customer, and the compute node monitoring agent is a component for each compute node.

System Configuration for Interoperations Between NFV Clouds

As described above, each NFV cloud may provide different service characteristics depending on its installation location, the number of compute nodes configured, and the processing capacity.

For example, the customer NFV cloud 200 configured with a single compute node illustrated in FIG. 2 may provide a minimum transmission latency since it is located in the customer premises. On the other hand, the LTO NFV Cloud 300 located in the LTO of the CSP is less in terms of transmission latency than the customer NFV Cloud 200, but it can provide better service in terms of scalability and stability. That is, even if a compute node accommodating the vCPE service for a customer fails, it can be immediately restored by using a compute node which is configured redundantly, thereby providing service continuity. Also, when the capacity of the customer NFV cloud 200 temporarily becomes insufficient according to increased traffic, additional vCPE services may be configured in the LTO NFV cloud 300 to process the increased traffic.

On the other hand, the DC NFV cloud 400 may not have the best quality in terms of transmission latency, but provide the best service in terms of scalability and stability. That is, although the LTO NFV Cloud 300 may be limited in terms of space and cost investment, the DC NFV cloud 400 may easily increase its accommodation capacity according to necessity.

As mentioned above, the various configurations of the NFV cloud (customer, LTO, DC) each have advantages and disadvantages. In order to complement the advantages and disadvantages of different types of NFV clouds, heterogeneous NFV clouds may interwork with each other to provide diversity of service configuration and resource efficiency. For example, the customer NFV cloud 200 and the LTO NFV cloud 300 may be connected, and the LTO NFV cloud 300 and the DC NFV cloud 400 may be connected to form an NFV cloud interworking system.

That is, if three types of NFV clouds are managed by a single integrated operating entity (an orchestrator, described below), various customer requirements may be satisfied with resiliency. When such a heterogeneous NFV cloud is configured as a coalition, if the throughput of the customer NFV cloud 200 is temporarily shortened, the LTO NFV cloud 300 may be used to satisfy the service requirement immediately. Also, even if a failure occurs in the customer NFV cloud 200, it is made possible to provide the service continuity by utilizing the LTO NFV cloud 300. Further, when the number of customers exceeds the maximum allowable number of customers in the LTO NFV cloud 300, new customers may be immediately accommodated before capacity addition of the LTO NFV cloud 300 by utilizing DC NFV-based cloud 400.

Figure 5:
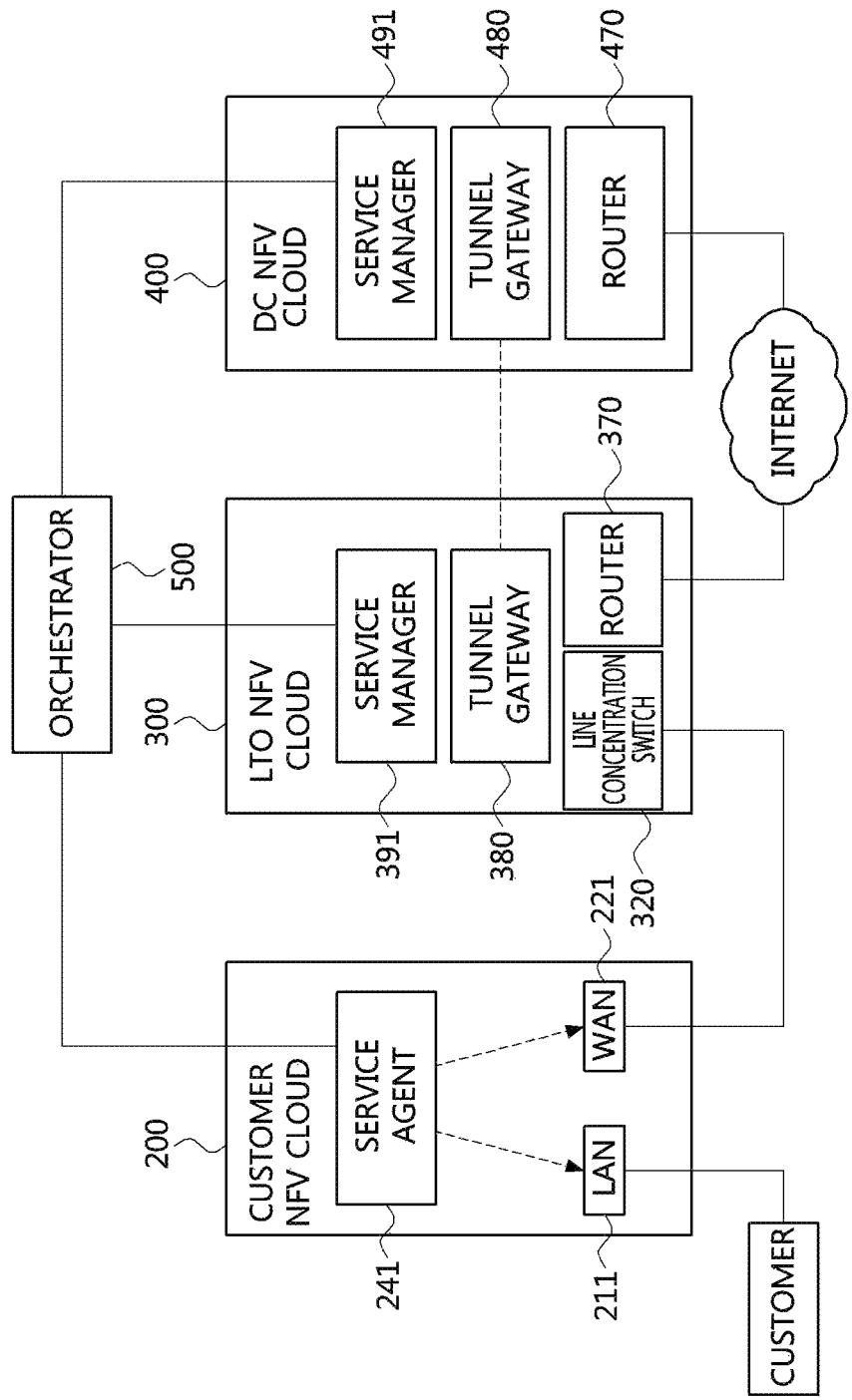
FIG. 5 is a block diagram illustrating a system for interoperations between NFV clouds according to an embodiment of the present disclosure.

FIG. 5 is a block diagram illustrating a system for interoperations between NFV clouds according to an embodiment of the present disclosure.

In FIG. 5, the internal components of the NFV clouds 200, 300, and 400 described in FIGS. 2 to 4 are omitted to explain the NFV cloud interworking concept according to an embodiment of the present disclosure, and only components for the interworking are illustrated. However, it should be noted that the omitted components are still present in each NFV cloud and perform their operations.

Referring to FIG. 5, in order for the NFV clouds to interwork with each other, there may be an orchestrator 500 which is an integrated operation entity for coordinating the management of the NFV clouds 200, 300, and 400, the service agent 241 for the customer NFV cloud 200, the service manager 391 for the LTO NFV cloud 300, and the service manager 491 for the DC NFV cloud 400. Meanwhile, in the case of the customer NFV cloud 200, it should be noted that the service agent 241 may be referred to as a service manager because it performs the role of the service manager together.

For the interworking of the NFV clouds, network connectivity between the interworking NFV clouds may be managed. That is, traffic may be exchanged between the interworking NFV clouds. In other words, the customer NFV cloud 200 may be able to transfer the traffic and the traffic processing to the LTO NFV cloud 300. Similarly the LTO NFV cloud 300 may be able to transfer the traffic and the traffic processing to the DC NFV cloud 400. In particular, the delivery of such traffic should be provided in a form that can distinguish customer traffics from each other. That is, in order to manage the network connectivity between them, it is necessary to manage unique information such as VLAN ID and tunnel ID, which is used to distinguish respective traffics.

Hereinafter, the above-mentioned components for implementing the interoperations between NFV clouds according to an embodiment of the present disclosure will be described.

The orchestrator 500 may manage information on the NFV clouds. The managed information on the NFV clouds may include unique information and name of each NFV cloud that can be used to identify each, a description on physical locations of the NFV clouds, information on types of the NFV clouds, location information of respective service managers (e.g., addresses of application programming interface (API)), and information for identifying an upper-level cloud or an lower-level cloud of each NFV cloud.

In addition, the orchestrator 500 may manage vCPE service configuration information for each customer. The configuration information for each vCPE service for each customer may include a list of vCPE services that the customer desires to receive, a connection relationship between the vCPE services, and configuration information for configuring each vCPE service. A NFV cloud may be dynamically added to or removed from a list of NFV clouds (hereinafter, referred to as a 'NFV cloud list') in which the vCPE service for each customer is located. In this case, the orchestrator 500 may configure or remove a vCPE service in the added NFV cloud using the vCPE service configuration information of the corresponding customer. Such the information for customer-specific vCPE services may be collected through the service agents 241, 311, and 411 and the service managers 241, 391, and 491.

The NFV clouds in the NFV cloud list may have a chain-like dependency on each other. For example, an upper-level NFV cloud of the customer NFV cloud 200 may be designated as the LTO NFV cloud 300, and an upper-level cloud of the LTO NFV cloud 300 may be designated as the DC NFV cloud 400. Designation for a lower-level cloud may be specified in reverse. The orchestrator 500 may control the service managers of the respective NFV clouds in response to requests of creating the vCPE service, the failure processing and deletion, and a service-level agreement (SLA) policy for the corresponding customer.

The service managers 241, 391, and 491 may reside in the respective NFV clouds 200, 300, and 400. The service manager may be responsible for making the traffic be delivered to each vCPE service after the vCPE service is created in the NFV cloud.

As described above, the service agent is a component that exists for each customer of the NFV cloud. The service agent may have a unique identifier for the customer and the NFV cloud, and may be directly connected to the orchestrator 500, or maintain the connection to the orchestrator 500 through the service manager. The orchestrator may be able to distinguish and manage the customer-specific vCPE services configured in each NFV cloud through connection with these service agents and service managers. Also, like the service agent, the monitoring agent, which is a component that exists for each customer of the NFV cloud, may also use the same identifier as the service agent, and provide the monitoring server with information for identifying which customer's vCPE service in which NFV cloud is a target being monitored.

In particular, as described above, the service manager 241 of the customer NFV cloud 200, as the service agent operating in the single compute node 221, may directly transfer the traffic from the LAN physical interface 211 to the WAN physical interface 221, when the vCPE service 230 is removed or a failure occurs in the vCPE service 230.

When a vCPE service for a customer is created, the service manager 391 of the LTO NFV cloud 300 may be responsible for configuring a path through which traffic for the customer is transferred to a compute node where the vCPE service is located by configuring a virtual network for the customer in the line concentration switch 320. Also, the router 370 and the WAN switch 361 may be controlled to provide an Internet connection to the created vCPE service. When the vCPE service is removed or fails, a path through the traffic is transferred from the line concentration switch 320 to the upper-level NFV cloud (i.e., the DC NFV cloud 400) may be configured. For example, a separate network device (e.g., the tunnel gateway 380 or the MPLS switch) providing network virtualization through configuration of a tunnel to the data center may be used within the LTO to connect the LTO to the DC NFV cloud 400, and the customer traffic from the line concentration switch 320 may be transferred to the upper-level NFV cloud (the DC NFV cloud 400) through the tunnel.

When a vCPE service for a customer is created, the service manager 491 of the DC NFV cloud 400 may be responsible for configuring a network connection to receive traffic for the customer transferred from the lower-level NFV cloud, and transferring the customer traffic to the corresponding vCPE service. That is, under the control of the orchestrator, the service manager 491 may forward the traffic of the customer, which has flowed through the tunnel gateway 480 according to the above-described tunneling process, to the TOR switch. Here, the traffic of the customer may be directly delivered to the DC NFV cloud 400 without going through the vCPE service for the corresponding customer of the customer NFV cloud 200, or without going through the vCPE service for the corresponding customer of the LTO NFV cloud 300.

Since the DC NFV cloud 400 is an uppermost-level NFV cloud, additional connections with an upper-level NFV cloud may not be prepared, but an Internet connection may be provided to the vCPE service by configuring a connection path with the router 470. Also, the DC NFV cloud 400 may provide a dualization configuration through a backup compute node in preparation for a case in which the vCPE service being provided fails. Finally, when the vCPE service is removed, the DC NFV cloud 400 may remove a reception path configured for the customer traffic.

Methods for Controlling Mobility Between NFV Clouds

A first form of interworking between NFV clouds may be implemented as including a DC NFV cloud and a LTO NFV cloud which is an upper-level NFV cloud of the DC NFV cloud (i.e., two-tier architecture). The first type is a service that continuously provides services through the DC NFV cloud when a failure occurs in the LTO NFV cloud.

A second form of interworking between NFV clouds is to provide a customer NFV cloud within the customer premises, configure a LTO NFV cloud as an upper-level NFV cloud of the customer NFV cloud, and configure a DC NFV cloud which is the uppermost-level NFV cloud (i.e., three-tier architecture). In this case, if the customer NFV cloud fails, continuity of vCPE services of the customer NFV cloud can be guaranteed by the LTO NFV cloud. Also, if the LTO NFV cloud fails, continuity of vCPE services of the LTO NFV cloud can be guaranteed by the DC NFV cloud.

If a SLA policy chosen by the customer is a policy that prioritizes minimum transmission latency, the vCPE services through the customer NFV cloud may be provided first, and then the vCPE services through the LTO NFV cloud may be provided. As another example, if a SLA policy chosen by the customer is a policy that prioritizes maximum scalability, the vCPE services for the customer may be placed first in the DC NFV cloud and the customer NFV cloud may be the last to be utilized. As a result, even if the bandwidth usage of the customer temporarily increases, it is made possible to continuously provide vCPE services without taking time for capacity expansion.

Figure 6:
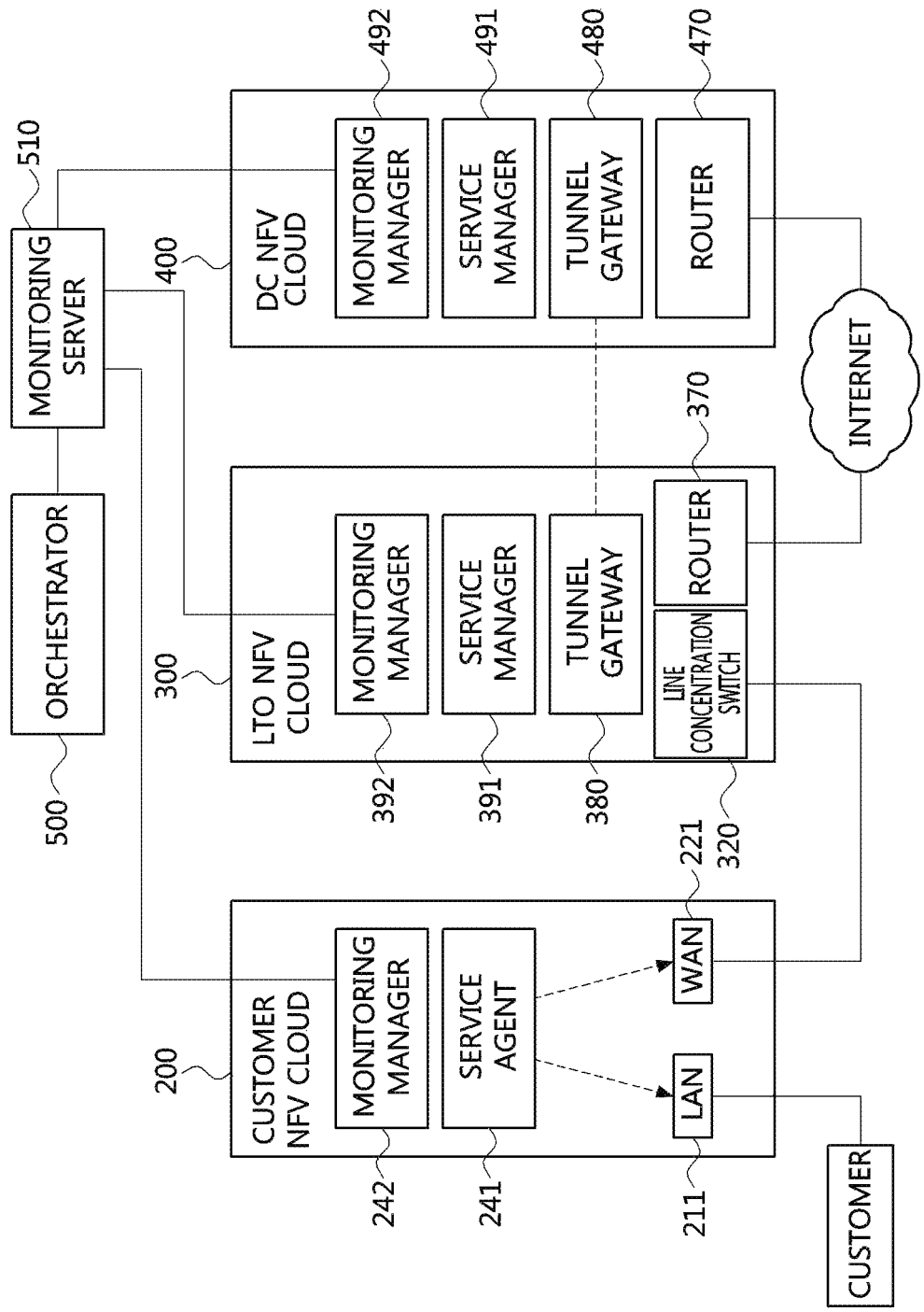
FIG. 6 is a conceptual diagram for explaining a concept of vCPE service mobility using a NFV cloud interworking system according to an embodiment of the present disclosure.

FIG. 6 is a conceptual diagram for explaining a concept of vCPE service mobility using a NFV cloud interworking system according to an embodiment of the present disclosure.

In order to implement a vCPE service mobility support method according to the present disclosure, the NFV cloud interworking system illustrated in FIG. 5 may have a monitoring server 510 additionally.

The monitoring server 510 may continuously monitor the status of each compute node in each NFV cloud, the statuses of vCPE services per customer in each compute node, and the statuses of the LAN/WAN physical interfaces of each computer node. In the case of the customer NFV cloud, the monitoring server 510 may directly monitor the statuses of the vCPE services 230 of the customer NFV cloud 200 and the statuses of the compute node of the customer NFV cloud 200 through the monitoring agent 242. Here, the monitoring agent 242 of the cloud NFV cloud 200 may be referred to as 'monitoring manager' in the same manner as the case of the service agent 241 described above.

On the other hand, in the case of the LTO NFV cloud 300 or the DC NFV cloud 400, the monitoring server 510 may receive information from a monitoring manager 392 or 492 of the LTO NFV cloud 300 or the DC NFV cloud 400, which has collected information from the monitoring agent 312 or 412 existing in each compute node in the NFV cloud 300 or 400.

Meanwhile, although FIG. 6 illustrates a case where the monitoring server 510 exists as a separate component from the orchestrator 500, the monitoring server 510 and the orchestrator 500 may exist as a single component.

The orchestrator 500 may control the mobility of the vCPE services for the customer by controlling the service managers 241, 391, and 491 of respective NFV clouds based on the information collected through the monitoring server 510.

Figure 7:
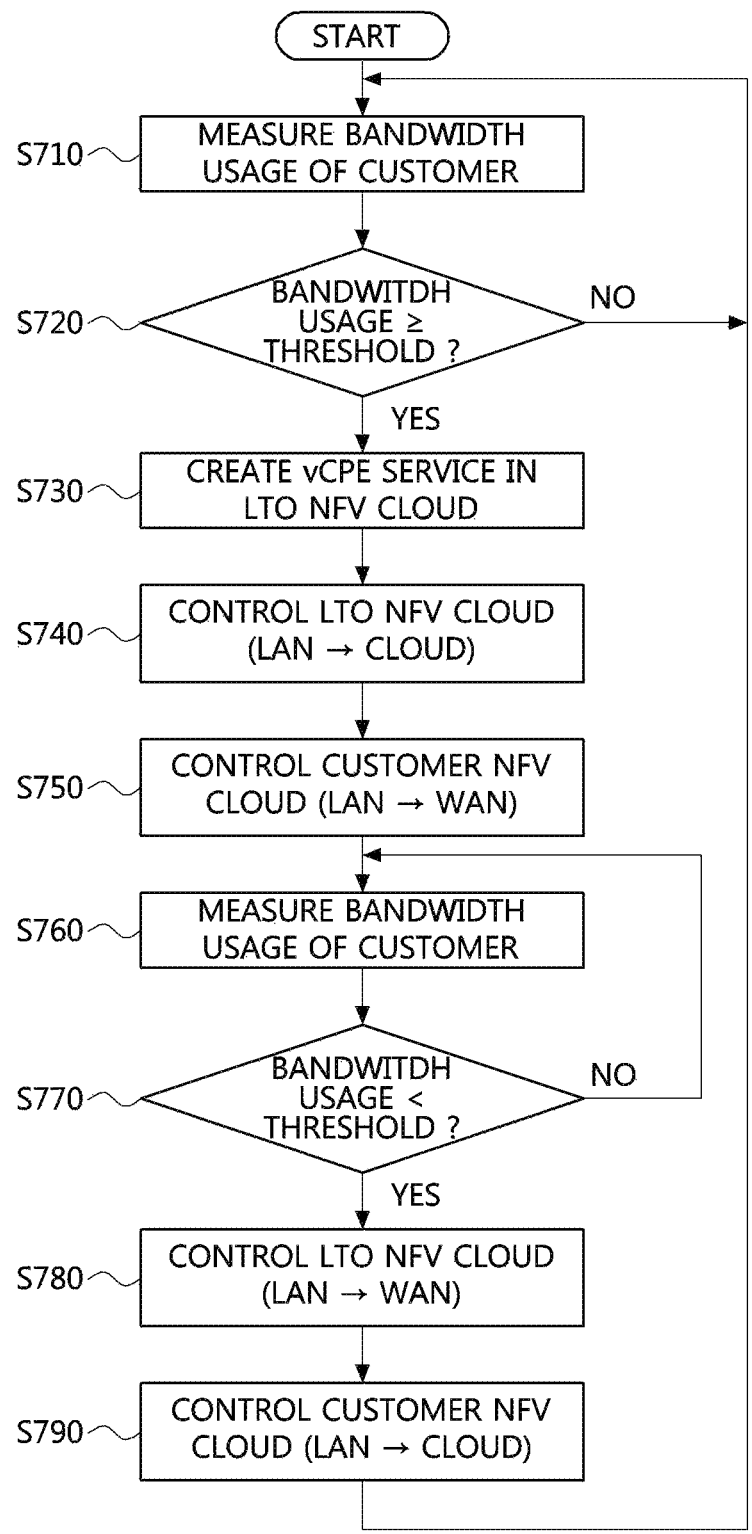
FIG. 7 is a flow chart for explaining a vCPE service mobility control method according to an embodiment of the present disclosure.

FIG. 7 is a flow chart for explaining a vCPE service mobility control method according to an embodiment of the present disclosure.

First, it is assumed that a SLA policy chosen by the customer is scale adjustment according to the bandwidth usage of the corresponding customer, and the vCPE service for the corresponding customer is currently being provided through the customer NFV cloud 200.

The monitoring server 510 may continuously measure the bandwidth usage of the customer and provide the bandwidth usage to the orchestrator 500 (S710). The orchestrator 500 may determine whether the bandwidth usage of the customer exceeds a predetermined threshold based on the bandwidth usage information collected through the monitoring server 510 (S720). If the bandwidth usage of the customer exceeds the predetermined threshold, vCPE services may be created in the LTO NFV cloud 300 which is an upper-level cloud of the customer NFV cloud 200.

In order to deliver the traffic to the vCPE services generated in the LTO NFV cloud 300, the line concentration switch 320 of the LTO NFV cloud 300 may be first controlled through the service manager 391 so that the traffic for the customer is transferred to the LTO NFV cloud 300 (i.e., the LAN physical interface 341 of the vCPE services) via the path 321 (S740). Then, the traffic for the customer may be controlled, through the service manager 241 of the customer NFV cloud 200, to be transferred to the LTO NFV cloud 300 without going through vCPE services of the customer NFV cloud 200 (S750). Here, the traffic for the customer may be L2 traffic and transferred to the LTO NFV cloud 300 via a predetermined tunneling process.

Then, the orchestrator 500 may continuously monitor the bandwidth usage of the corresponding user through the monitoring server 510 (S760). The bandwidth usage of the customer may be compared again with the predetermined threshold (S770) and, if the bandwidth usage of the customer falls below the threshold, the traffic transmitted to the LTO NFV cloud 300 may be configured to be directly connected to the Internet (i.e., by controlling the line concentration switch 320 so that the customer traffic is delivered via the path 323; S780), and the customer traffic may be processed by the vCPE services of the customer NFV cloud 200 (S790).

In the steps S740 and S780, the orchestrator 500 may control the service manager 391 of the LTO NFV cloud 300 to control the line concentration switch 320. In the steps S750 and S790, the orchestrator 500 may control the service manager 241 of the customer NFV cloud 200 to change the hardware configuration of the bypass NIC or the bridge function of the OS.

Meanwhile, the embodiment illustrated in FIG. 7 exemplifies a case where a SLA policy chosen by the customer is a policy based on the bandwidth usage of the corresponding customer. However, various embodiments according to SLA policies based on the minimum transmission latency or the maximum scalability are also possible.

That is, if the SLA policy chosen by the customer prioritizes minimum transmission latency, the vCPE service through the customer NFV cloud 200 is provided first, and then the vCPE service through the LTO NFV cloud 300 and the DC NFV cloud 400 may be provided. As another example, if the SLA policy chosen by the customer prioritizes maximum scalability, the vCPE service through the DC NFV cloud 400 is provided first, and then the vCPE service through the LTO NFV cloud 300 and the customer NFV cloud 200 may be provided.

Figure 8:
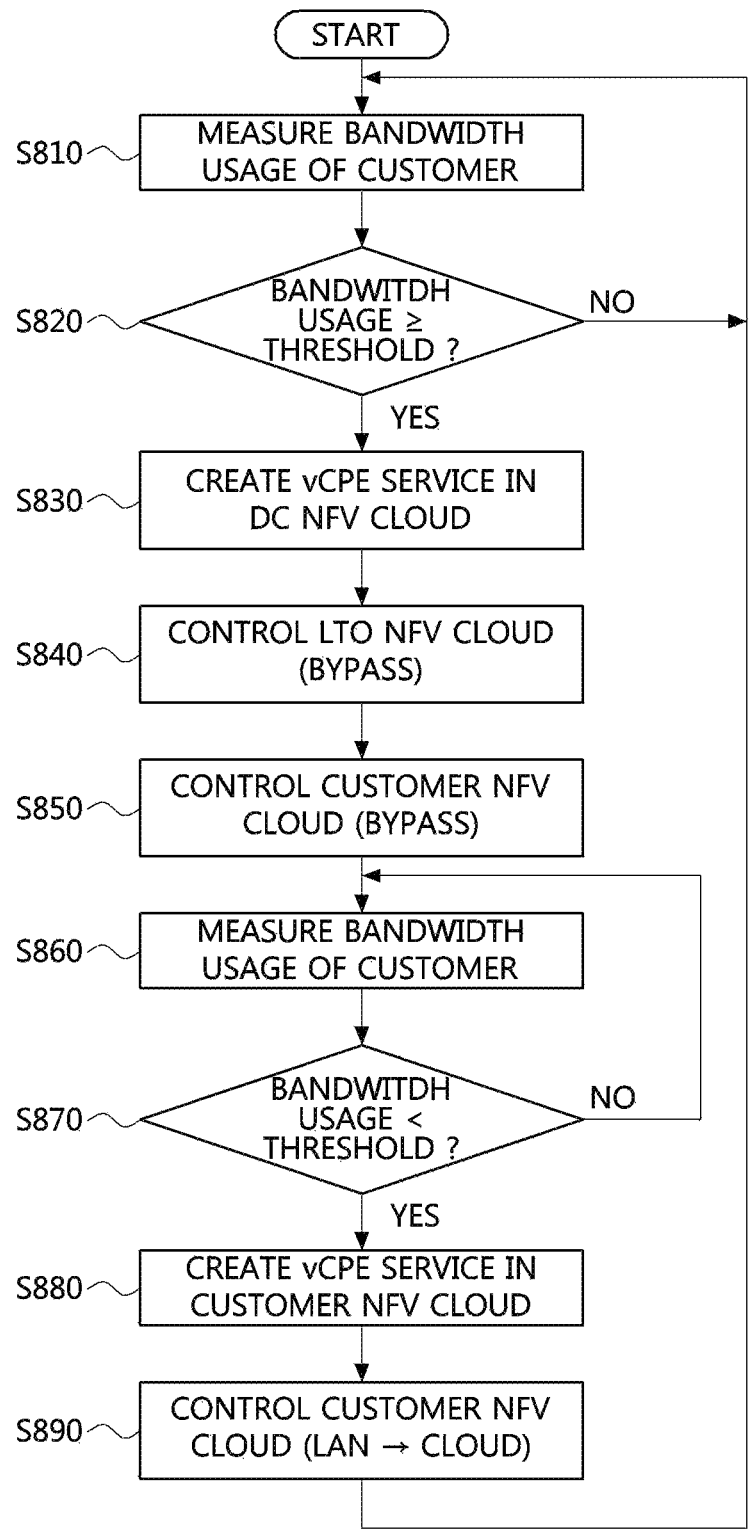
FIG. 8 is a flow chart for explaining a vCPE service mobility control method according to another embodiment of the present disclosure.

Meanwhile, although the embodiment illustrated in FIG. 7 is an embodiment of a vCPE service mobility control method between the customer NFV cloud and the LTO NFV cloud, a vCPE service mobility control method between the customer company NFV cloud 200 and the DC NFV cloud 400 or a vCPE service mobility control method between the LTO NFV cloud 300 and the DC NFV cloud 400 can be described in the similar manner. FIG. 8 is a flow chart for explaining a vCPE service mobility control method according to another embodiment of the present disclosure.

The embodiment illustrated in FIG. 8 is for the case of moving the vCPE service running on the customer NFV cloud to the DC NFV cloud. It is assumed that a SLA policy chosen by the customer is a scale adjustment according to the bandwidth usage of the customer, and a vCPE service for the customer is currently being provided through the customer NFV cloud 200.

In FIG. 8, a step S810 of measuring the bandwidth usage of the customer and providing the bandwidth usage to the orchestrator 500 is the same as the step S710. The orchestrator 500 may determine whether the bandwidth usage of the customer exceeds a predetermined threshold based on the bandwidth usage information of the customer collected through the monitoring server 510 (S820). If the predetermined threshold value is exceeded, vCPE services may be created by the DC NFV cloud (S830).

In order to directly deliver customer traffic flowing into the customer NFV cloud 200 to the vCPE services created in the DC NFV cloud 400, the line concentration switch 320 of the LTO NFV cloud 300 may be controlled through the service manager 391 so that the traffic for the customer is directly transferred to the DC NFV cloud 400 (S840). For example, the line concentration switch 320 may be controlled to select the path 322. Also, the orchestrator 500 may control the service manager 241 of the customer NFV cloud 200 such that the customer traffic inputted to the LAN physical interface 211 is directly transferred to the WAN physical interface 221 (S850). That is, through the steps S840 and step S850, L2 traffic of the customer may be transferred directly to the DC NFV cloud 400 without going through the customer NFV cloud 200 and the Co NFV cloud 300, and the vCPE services created in the DC NFV cloud 400 may be provided.

Thereafter, the orchestrator 500 may continuously monitor the bandwidth usage of the customer through the monitoring server 510 (S860). The bandwidth usage of the customer may be compared again with the predetermined threshold (S870) and, if the bandwidth usage of the customer falls below the threshold, vCPE services for the customer may be created again in the customer NFV cloud 200 (S880). Also, the service manager 241 of the customer NFV cloud 200 may be controlled to set the customer traffic flowing into the LAN physical interface 211 to be processed by the vCPE services of the customer NFV cloud 200 again.

Dualization and Synchronization Between vCPEs on Difference NFV Clouds

The vCPE service mobility between NFV clouds by the interworking between NFV clouds described above assumes that vCPE services for a specific customer are provided actually by two or more NFV clouds.

For example, the vCPE services for the specific customer provided by the customer NFV cloud 200 may be dualized (duplicated) in the LTO NFV cloud 300 and/or DC NFV cloud 400.

Meanwhile, unlike the usual NFV redundancy, the vCPE dualization concept applied in the NFV cloud interworking according to the present disclosure is not a duplication of the vCPE service, but a duplication of configuration of the physical compute node of the customer NFV cloud 200, which exists in the customer NFV cloud.

For example, rather than duplicating only the vCPE services configured in the customer NFV cloud 200, the configuration of the compute node constituting the customer NFV Clout 200 itself may be duplicated in the LTO NFV cloud 300 or the DC NFV cloud 400.

That is, the vCPE services 230, the LAN virtual network 210, and the WAN virtual network 220 as well as the service agent 241 and the monitoring agent 242 constituting the customer NFV cloud 200 may be duplicated as virtualized in at least one compute node residing in the LTO NFV cloud 300 or the DC NFV cloud 400.

Meanwhile, for the dualization, the orchestrator 500 may request periodic backup to the service agents of the activated NFV cloud. The service agents receiving the backup request from the orchestrator 500 may perform backup of the information on all the vCPE services managed by itself, the configuration information about the environment of the NFV cloud in which they are located, and the information on themselves and the monitoring agents, and store them in an internal storage. Also, the service agents may store the backup information in a remote backup storage as they can be distinguished based on identification of customers. The backup information stored in the remote backup storage or internal storage may be referred to by the orchestrator 500, and used to virtualize and duplicate the same vCPE services, service agents, and monitoring agents for the customer in another NFV cloud.

Figure 9:
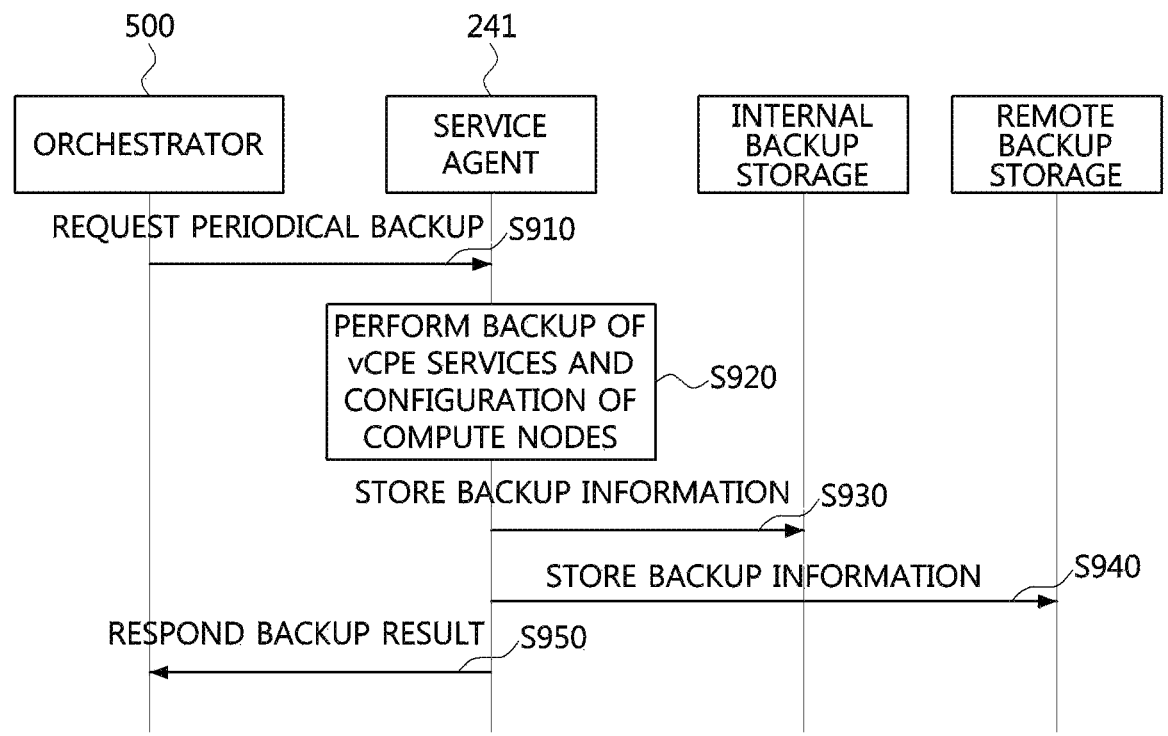
FIG. 9 is a sequence chart for explaining a method of performing backup for vCPE services by utilizing a NFV cloud interworking concept according to the present disclosure.

FIG. 9 is a sequence chart for explaining a method of performing backup for vCPE services by utilizing a NFV cloud interworking concept according to the present disclosure.

In FIG. 9, illustrated is a procedure of backing up the configuration of the compute node and the vCPE services running on the customer NFV cloud 200 by interoperation between with the orchestrator 500 and the service agent 241 of the customer NFV cloud 200.

The service agent 241 receiving the backup request may perform backup of the vCPE services running on the customer NFV cloud 200 (S920). At this time, the backup may be performed not only for the vCPE services, but also for the service agent 241 and the monitoring agent 242. That is, as mentioned above, in the dualization according to the present disclosure, not only the vCPE services running on the NFV cloud but the configuration of the compute node constituting the NFV cloud may be duplicated.

Also, the service agent 241 may store the backup information at a predetermined internal backup storage (S930), and may also store a copy of the backup information at a predetermined remote backup storage (S940).

Finally, the service agent 241 may respond to the backup request in response to the backup request to the orchestrator 500 (S950).

Also, when the NFV cloud in which the vCPE service for each customer is located is newly added to the NFV cloud list, if the backup information for the vCPE service of the customer exists, the orchestrator 500 may configure the newly configured vCPE services with the latest settings by applying the backup information to the newly configured vCPE services. Also, the orchestrator 500 may periodically back up configuration of activated vCPE services among all vCPE services of all customers, and apply the configuration to all vCPE services in the NFV cloud list so that all vCPE service for the customer running on the NFV clouds in the NFV cloud list finally have the same settings. This may ensure that continuity of services can be maintained by immediately replacing the vCPE services in the failed NFV cloud through any NFV cloud on the NFV cloud list in the event of a potential vCPE service failure.

Figure 10:
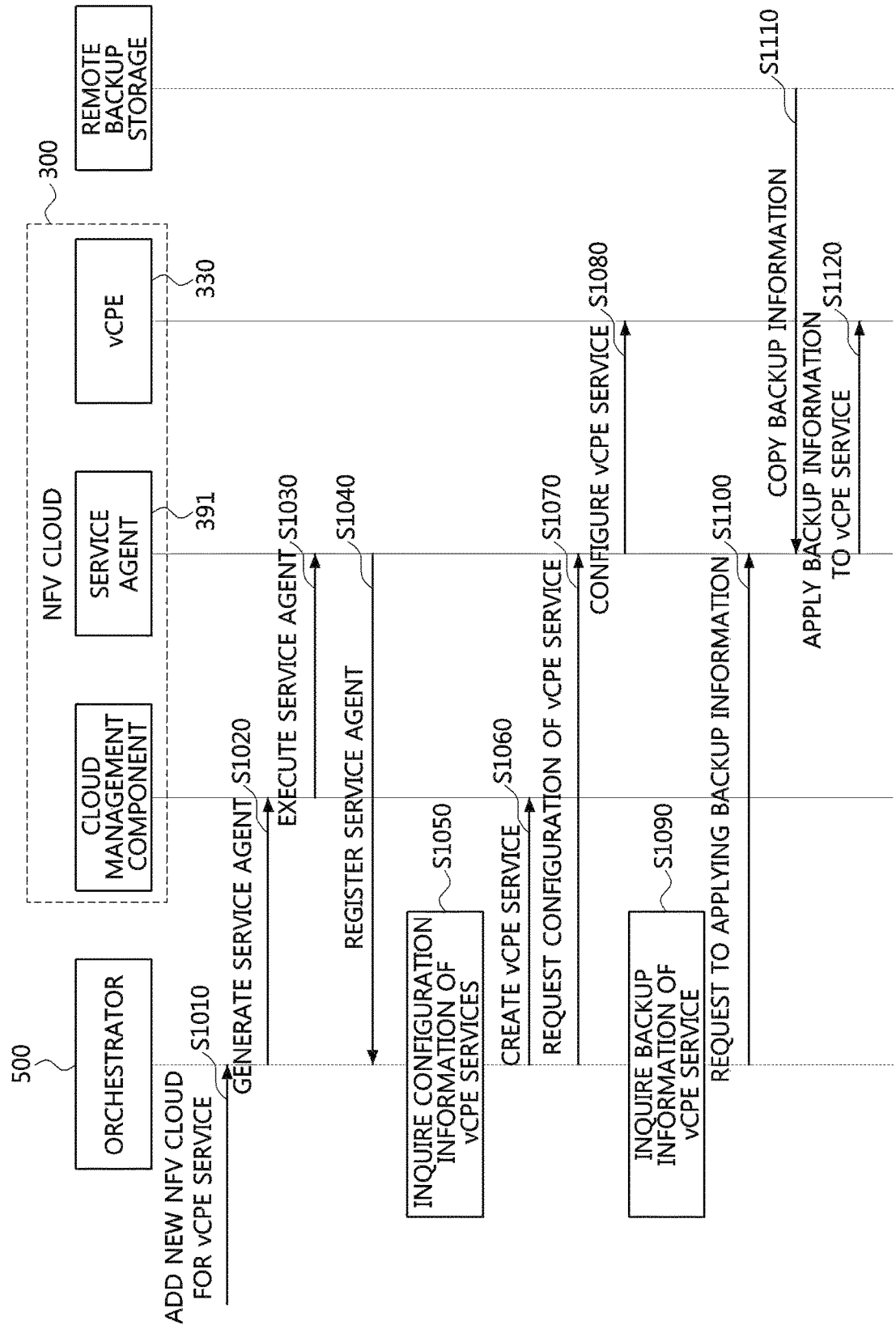
FIG. 10 is a sequence chart for explaining a method of performing dualization of vCPE services by utilizing a NFV cloud interworking concept according to the present disclosure.

FIG. 10 is a sequence chart for explaining a method of performing dualization of vCPE services by utilizing a NFV cloud interworking concept according to the present disclosure.

In FIG. 10, illustrated is a procedure of dualizing the customer NFV cloud 200 on the LTO NFV cloud 300 using the backup information of the customer NFV cloud 200 generated through the procedure described above with reference to FIG. 9.

Referring to FIG. 10, the orchestrator 500 may be requested by a system operator to additionally create a vCPE service for the customer receiving the vCPE service through the customer NFV cloud 200 in the LTO NFV cloud 300 (S1010). In response to the request, the orchestrator 500 may first request a cloud management component managing the LTO NFV cloud 300 to create the service agent 391 corresponding to the customer (S1020). At this time, the created service agent 391 may be executed by the cloud management component (S1030) and may request registration to the orchestrator 500 (S1040).

Meanwhile, the orchestrator 500 may inquire configuration information of the vCPE services for the corresponding customer managed by the orchestrator 500 (S1050), and request the LTO NFV cloud 300 to create the vCPE services 330 based on the inquired configuration information of the vCPE services for the corresponding customer (S1060). Also, the orchestrator 500 may request the service agent 391 to configure the created vCPE service 330 (S1070), and the service agent 391 may configure the vCPE service 300 in response to the request (S1080).

As described above, the orchestrator 500 may inquire the backup information of the vCPE services for the corresponding customer stored in the remote backup storage or the internal storage of the customer NFV cloud 200 (S1090). If the backup information of the vCPE services for the customer exists, the orchestrator 500 may request the service agent 391 to apply the backup information to the vCPE services 330 (S1100).

In response to the request of the orchestrator 500, the service agent 391 may read the backup information stored in the remote backup storage (S1110), and apply the read backup information to the vCPE service (S1120).

Through the above procedure, the vCPE services for the corresponding customer running on all the NFV clouds in the NFV cloud list may finally have the same configuration.

While the exemplary embodiments of the present invention and their advantages have been described in detail, it should be understood that various changes, substitutions and alterations may be made herein without departing from the scope of the invention.

What is claimed is:

1. A computer node for providing virtual customer premises equipment (vCPE) services to a customer by using network function virtualization (NFV) clouds located in different regions, the computer node comprising at least one processor, wherein the at least one processor is configured to:
  interwork with a service manager located in each of the NFV clouds; and
  control the service manager to move a vCPE service for the customer from a first NFV cloud to a second NFV cloud among the NFV clouds, and provide the vCPE service to the customer through the second NFV cloud,
  wherein the different regions include at least two of customer premises, a local telecommunication office (LTO) of a communication service provider, and a data center (DC),
  wherein, when the second NFV cloud is a LTO NFV cloud located in the LTO, layer-2 (L2) traffic of the customer is transferred to the LTO NFV cloud through a customer NFV cloud located in the customer premises, and
  wherein, when the second NFV cloud is a DC NFV cloud located in the DC, L2 traffic of the customer is transferred to the DC NFV cloud through the customer NFV cloud located in the customer premises and the LTO NFV cloud located in the LTO.

2. The computer node according to claim 1, wherein one of the NFV clouds is a customer NFV cloud located in the customer premises, and the customer NFV cloud comprises:
  at least one vCPE service having a local area network (LAN) virtual interface and a wide area network (WAN) virtual interface, respectively;
  a LAN virtual network coupled to the LAN virtual interface of the at least one vCPE service;
  a WAN virtual network coupled to the WAN virtual interface of the at least one vCPE service;
  a LAN physical interface for providing customer traffic received from the customer to the LAN virtual network; and
  a WAN physical interface for outputting traffic that has passed through the at least one vCPE service output from the WAN virtual network.

3. The computer node according to claim 2, wherein the customer NFV cloud further comprises a service manager controlling, in accordance with a control of an orchestrator managing at least two NFV clouds including the NFV cloud, the LAN physical interface and the WAN physical interface so that the customer traffic received from the LAN physical interface is transferred to the LAN virtual network or is directly outputted through the WAN physical interface.

4. The computer node according to claim 1, wherein
  one of the NFV clouds is a LTO NFV cloud located in the LTO of the communication service provider,
  the LTO NFV cloud comprises at least one compute node, a local area network (LAN) switch, a wide area network (WAN) switch, a line concentrator switch, and a router, and
  each of the at least one compute node comprises:
    at least one vCPE service having a LAN virtual interface and a WAN virtual interface, respectively;
    a LAN virtual network coupled to the LAN virtual interface of the at least one vCPE service;
    a WAN virtual network coupled to the WAN virtual interface of the at least one vCPE service;
    a LAN physical interface coupled to the LAN virtual network and the LAN switch; and
    a WAN physical interface coupled to the WAN virtual network and the WAN switch,
  wherein the line concentration switch transfers customer traffic flowing from the customer to the LAN switch, transfers the customer traffic directly to the router, or outputs the customer traffic to the router or outside through a predetermined tunneling process, and
  wherein the router outputs the customer traffic transferred directly from the WAN switch or the line concentration switch to outside, or outputs the customer traffic transferred from the line concentration switch to outside through a predetermined tunneling.

5. The computer node according to claim 1, wherein one of the NFV clouds is a DC NFV cloud located in the DC, the DC NFV cloud comprises at least one compute node, a top of rack (TOR) switch, and a router, and each of the at least one computer node comprises:
  at least one vCPE service having a local area network (LAN) virtual interface and a wide area network (WAN) virtual interface, respectively;
  a LAN virtual network coupled to the LAN virtual interface of the at least one vCPE service;
  a WAN virtual network coupled to the WAN virtual interface of the at least one vCPE service; and
  a physical interface coupled to the LAN virtual network and the WAN virtual network,
  wherein the TOR switch separates a LAN traffic from the customer and a WAN traffic from outside by using network virtualization techniques applied to the LAN traffic and WAN traffic, transfers the LAN traffic to the LAN virtual network, and transfers the WAN traffic to the WAN virtual network.

6. The computer node according to claim 1, wherein the at least one processor is further configured to collect status information of the NFV clouds, and each of the NFV clouds has a monitoring agent reporting status information of each of the NFV clouds to the computer node.

7. A network function virtualization (NFV) cloud computer node that comprises:
  a line concentration switch that: (i) receives customer traffic data inputted to a local area network (LAN) physical interface located at a customer's premises and (ii) has at least two output ports for selecting one of at least two output paths including a first path that passes the customer traffic data to at least one processor located at a customer's premises and a second path that passes the customer traffic data to a NFV cloud of the NFV cloud computer node that provides at least one virtual customer premises equipment (vCPE) service, wherein
  the NFV cloud computer node is a computer configured to:
    collect bandwidth usage information based on the customer traffic data;
    based on the collected bandwidth usage information, determine whether a bandwidth usage of the customer exceeds a predetermined threshold based on the collected bandwidth usage information; and
    based on the bandwidth usage of the customer exceeding the predetermined threshold, control the line concentration switch such that the customer traffic data is passed, via the second path via a second output port of the line concentration switch, to the NFV cloud that provides the at least one vCPE service,
  the NFV cloud computer node further comprises
    a local area network (LAN) virtual interface and a wide area network (WAN) virtual interface, respectively;
    a LAN virtual network coupled to the LAN virtual interface;
    a WAN virtual network coupled to the WAN virtual interface;

the LAN physical interface for providing the customer traffic data received from the customer to the LAN virtual network; and a WAN physical interface for outputting traffic data that has passed through the at least one vCPE service output from the WAN virtual network; and the NFV cloud controls the line concentration switch so that the customer traffic data received from the LAN physical interface is transferred to the LAN virtual network or directly outputted through the WAN physical interface.

8. The NFV cloud computer node according to claim 7, wherein the at least one vCPE service is at least one of: a conversion service that converts a private internet protocol (IP) address and port into a public IP address and port to enable communications between a private IP network and a public IP network, a configuration service for configuring the customer's internal network as a private IP network, or an assignment service of assigning a private IP address to a terminal or a connected network device.

9. The NFV cloud computer node according to claim 7, wherein the NFV cloud controls the customer traffic data received from the LAN physical interface to be directly outputted through the WAN physical interface by using a bridge function of an operating system of a compute node in which the NFV cloud is located or a bypass network interface card (NIC) function of the LAN physical interface.

10. The NFV cloud computer node according to claim 7, wherein the NFV cloud reports information regarding at least one of: the at least one vCPE service, the LAN virtual network, the WAN virtual network, the LAN physical interface, or the WAN physical interface.

11. The NFV cloud computer node according to claim 7, wherein, when a service level agreement (SLA) policy for the customer is a policy that prioritizes minimum transmission latency, the NFV cloud provides the customer traffic data to the customer via the first path prior to providing to the NFV cloud.

12. A network function virtualization (NFV) cloud computer node that comprises:

a line concentration switch that: (i) receives customer traffic data inputted to a local area network (LAN) physical interface located at a customer's premises and (ii) has at least two output ports for selecting one of at least two output paths including a first path that passes the customer traffic data to at least one processor located at a customer's premises and a second path that passes the customer traffic data to a NFV cloud of the NFV cloud computer node that provides at least one virtual customer premises equipment (vCPE) service, wherein the NFV cloud computer node is a computer configured to:

collect bandwidth usage information based on the customer traffic data;

based on the collected bandwidth usage information, determine whether a bandwidth usage of the customer exceeds a predetermined threshold based on the collected bandwidth usage information; and based on the bandwidth usage of the customer exceeding the predetermined threshold, control the line concentration switch such that the customer traffic data is passed, via the second path via a second output port of the line concentration switch, to the NFV cloud that provides the at least one vCPE service, the NFV cloud computer node further comprises:

at least one vCPE service having a LAN virtual interface and a WAN virtual interface, respectively;

a LAN virtual network coupled to the LAN virtual interface of the at least one vCPE service;

a WAN virtual network coupled to the WAN virtual interface of the at least one vCPE service;

a LAN physical interface coupled to the LAN virtual network and the LAN switch;

a WAN physical interface coupled to the WAN virtual network and the WAN switch; and a router; and the line concentration switch transfers customer traffic data flowing from the customer to the LAN switch, transfers the customer traffic directly to the router, or outputs the customer traffic to the router or outside through a predetermined tunneling under a control of the service manager.

13. The NFV cloud computer node according to claim 12, wherein the predetermined tunneling includes at least one of a generic routing encapsulation (GRE) tunneling, a stateless transport tunneling (STT), or a VxLAN tunneling, and the customer traffic data outputted to the router through the predetermined tunneling is outputted to outside through the router.

14. The NFV cloud computer node according to claim 12, wherein the predetermined tunneling includes a tunneling through a multi-protocol label switching (MPLS) switch, and the customer traffic data to which the tunneling through the MPLS switch is applied is output to outside without going through the router.

15. The NFV cloud computer node according to claim 12, wherein the at least one vCPE service is at least one of: a conversion service that converts a private internet protocol (IP) address and port into a public IP address and port to enable communications between a private IP network and a public IP network, a configuration service for configuring the customer's internal network as a private IP network, or an assignment service of assigning a private IP address to a terminal or a connected network device.

16. The NFV cloud computer node according to claim 12, wherein, based on a service level agreement (SLA) policy for the customer is a policy that prioritizes minimum transmission latency, the NFV cloud computer node provides the customer traffic data to the customer via the first path prior to providing to the NFV cloud.

* * * * *